(12) United States Patent
Ichikawa et al.

(10) Patent No.: US 7,525,593 B2
(45) Date of Patent: Apr. 28, 2009

(54) POSITION DETECTION APPARATUS, POSITION DETECTION METHOD, TESTING APPARATUS, AND CAMERA MODULE MANUFACTURING APPARATUS

(75) Inventors: Masayoshi Ichikawa, Tokyo (JP);
Takahiro Yamaguchi, Tokyo (JP)

(73) Assignee: Advantest Corporation, Tokyo (JP)

( * ) Notice: Subject to any disclaimer, the term of this patent is extended or adjusted under 35 U.S.C. 154(b) by 576 days.

(21) Appl. No.: 11/334,752

(22) Filed: Jan. 19, 2006

(65) Prior Publication Data
US 2006/0187337 A1 Aug. 24, 2006

(51) Int. Cl.
*H04N 5/222* (2006.01)
*H04N 17/00* (2006.01)

(52) U.S. Cl. .............. 348/370; 348/187; 348/189; 348/190

(58) Field of Classification Search ........... 348/370, 348/187, 189, 190
See application file for complete search history.

(56) References Cited

U.S. PATENT DOCUMENTS

| | | | |
|---|---|---|---|
| 5,331,275 A * | 7/1994 | Ozaki et al. | 324/757 |
| 5,453,606 A | 9/1995 | Hojo | |
| 5,805,218 A | 9/1998 | Ohura et al. | |
| 5,807,104 A * | 9/1998 | Ikeya et al. | 439/73 |
| 6,566,669 B2 * | 5/2003 | Watanabe | 250/559.3 |
| 6,625,558 B1 * | 9/2003 | Van Ausdall et al. | 702/117 |
| 6,765,396 B2 * | 7/2004 | Barror | 324/753 |
| 6,987,577 B2 * | 1/2006 | Wengender | 358/1.14 |
| 7,085,408 B1 * | 8/2006 | Chung-Chi Jim | 382/149 |
| 7,127,098 B2 * | 10/2006 | Shimoda et al. | 382/145 |
| 7,193,728 B2 * | 3/2007 | Ichikawa et al. | 356/614 |
| 7,253,443 B2 * | 8/2007 | Yoshida et al. | 257/80 |
| 2004/0027586 A1 * | 2/2004 | Ichikawa et al. | 356/614 |

FOREIGN PATENT DOCUMENTS

| | | |
|---|---|---|
| JP | 265766 | 9/1994 |
| JP | 9-69973 | 3/1997 |

(Continued)

OTHER PUBLICATIONS

PCT Publication No. WO 2005/010461 with International Search Report (PCT/ISA/210), issued in connection with PCT/JP2004/010470.

(Continued)

*Primary Examiner*—James M Hannett
(74) *Attorney, Agent, or Firm*—Sterne, Kessler, Goldstein & Fox P.L.L.C.

(57) ABSTRACT

There is provided a position detection apparatus for detecting position of an image pickup device that outputs an output signal corresponding to intensity of detected light, having a light source for generating light, an illumination lens for illuminating the light generated by the light source onto the image pickup device, a position detecting section for detecting relative position of the image pickup device with respect to the illumination lens based on the output signal outputted out of the image pickup device corresponding to the light received via the illumination lens and a moving section for changing the relative position of the image pickup device to position set in advance by moving at least one of the image pickup device and the illumination lens based on the relative position detected by the position detecting section.

12 Claims, 17 Drawing Sheets

FOREIGN PATENT DOCUMENTS

| | | |
|---|---|---|
| JP | 10-019516 | 1/1998 |
| JP | 2001 326789 A | 11/2001 |
| JP | 2001313779 A | 11/2001 |
| JP | 2003280235 | 10/2003 |
| JP | 2004-012960 | 1/2004 |
| JP | 2004010470 | 1/2004 |

OTHER PUBLICATIONS

Notification Concerning Submission or Transmittal of Priority Document (PCT/IB/304) issued for PCT/JP2004/010470.

Japan Patent Office. Japan Office Action dated Dec. 9, 2008. Japan Application No. 2005-512026. Japanese Language. 3 pages.

\* cited by examiner

US 7,525,593 B2

POSITION DETECTION APPARATUS, POSITION DETECTION METHOD, TESTING APPARATUS, AND CAMERA MODULE MANUFACTURING APPARATUS

BACKGROUND OF THE INVENTION

1. Field of the Invention

The present invention relates to a position detection apparatus, a position detection method, a testing apparatus and a camera module manufacturing apparatus. More specifically, the invention relates to a position detection apparatus for detecting position of an image pickup device that outputs an output signal corresponding to intensity of detected light.

The present application relates to Japanese Patent Application No. 2003-280235 filed on Jul. 25, 2003 and PCT Application No. JP2004/010470 filed on Jul. 23, 2004. The contents described in those applications are incorporated in the present application by reference as part thereof.

2. Related Art

With miniaturization and increase of definition of camera, miniaturization and multiplication of pixels of image pickup devices such as a CCD image sensor are being promoted lately. The miniaturization and multiplication of pixels of the image pickup device may be realized by miniaturizing photo-detecting elements. However, an aperture area of the photo-detecting element becomes small and thereby a quality of light detected by each photo-detecting element decreases as the photo-detecting element is miniaturized. To that end, a technology of increasing the aperture area by forming a condensing micro lens on each photo-detecting element has been developed.

Still more, a distance between the image pickup device and a lens for illuminating light on the image pickup device is shortened as the camera is miniaturized. Therefore, a short focal distance lens having a short focal distance is used for the camera module.

However, the image pickup device cannot be evenly illuminated by light in testing such image pickup device if position of the short focal distance lens is misaligned from designed position with respect to the image pickup device. Therefore, there has been a case that it is unable to accurately test the image pickup device. Then, it has been necessary to accurately detect the position of the short focal distance lens and the image pickup device and to adjust with the designed position.

SUMMARY OF THE INVENTION

Accordingly, it is an object of the invention to provide a position detection apparatus, a position detection method, a testing apparatus and a camera module manufacturing apparatus which are capable of solving the above-mentioned problem. This object may be achieved through the combination of features described in independent claims of the invention. Dependent claims thereof specify preferable embodiments of the invention.

According to a first aspect of the invention, there is provided a position detection apparatus for detecting position of an image pickup device that outputs an output signal corresponding to intensity of detected light, having a light source for generating light, an illumination lens for illuminating the light generated by the light source onto the image pickup device and a position detecting section for detecting relative position of the image pickup device with respect to the illumination lens based on the output signal outputted out of the image pickup device corresponding to the light received via the illumination lens.

The image pickup device described above has a plurality of photo-detecting elements that outputs the output signal corresponding to intensity of the detected light and a plurality of micro-lenses provided in correspondence to the plurality of photo-detecting elements and having an optical axis, respectively, at position deviated to the inside from the center of the corresponding photo-detecting element as the corresponding photo-detecting element is distant from the center of array of the plurality of photo-detecting elements, and the position detection apparatus further includes a moving section for changing the relative position of the image pickup device to position set in advance by moving at least one of the image pickup device and the illumination lens based on the relative position detected by the position detecting section.

The moving section described above changes the relative position of the image pickup device to the position set in advance so that the intensity of light received by the respective photo-detecting elements becomes almost equal.

The position detection apparatus further includes a slit in which an opening that transmits a part of the light generated by the light source is provided at known position with respect to the illumination lens, and the illumination lens projects an image of the opening on the image pickup device by illuminating the light received from the light source via the opening of the slit onto the image pickup device, the image pickup device outputs the output signal that presents the projected image of the opening and the position detecting section detects relative position of the image pickup device with respect to the illumination lens by detecting the relative position of the opening with respect to the image pickup device based on the output signal of the image pickup device.

The center of the openings described above is provided at position overlapping with an optical axis of the illumination lens and the position detecting section detects relative position of the slit with respect to the image pickup device by calculating relative position of a center of images of the openings with respect to a center of array of the plurality of photo-detecting elements.

The slit described above has a plurality of the openings that extend respectively in an extension direction parallel to each other, the illumination lens projects respective images of the plurality of openings onto the image pickup device and the position detecting section detects the relative position of the image pickup device with respect to the illumination lens in an array direction in which the plurality of openings is arrayed based on differences of brightness of the respective images.

The slit described above further includes a plurality of openings that extend in the array direction, the illumination lens also projects the respective images of the plurality of openings that extend respectively in the array direction onto the image pickup device and the position detecting section also detects the relative position of the image pickup device with respect to the illumination lens in the extension direction based on the differences of brightness of the respective images of the plurality of openings extending respectively in the array direction.

According to a second aspect of the invention, there is provided a position detection method for detecting position of an image pickup device that outputs an output signal corresponding to intensity of detected light, having a light generating step of generating light, an illumination step of illuminating the light generated by the light source onto the image pickup device by means of an illumination lens and a position detecting step of detecting relative position of the image pickup device with respect to the illumination lens based on the output signal outputted out of the image pickup device corresponding to the light received via the illumination lens.

According to a third aspect of the invention, there is provided a testing apparatus for testing an image pickup device that outputs an output signal corresponding to intensity of detected light, having a light source for generating light, an illumination lens for illuminating the light generated by the light source on the image pickup device, a position detecting section for detecting relative position of the image pickup device with respect to the illumination lens based on the output signal outputted out of the image pickup device corresponding to the light received via the illumination lens, a moving section for changing the relative position of the image pickup device to position set in advance by moving at least one of the image pickup device and the illumination lens based on the relative position detected by the position detecting section and a judging section for judging whether or not the image pickup device is defect-free based on the output signal outputted out of the image pickup device held at the position set in advance in testing the image pickup device.

According to a fourth aspect of the invention, there is provided a camera module manufacturing apparatus for manufacturing a camera module having an image pickup device that outputs an output signal corresponding to intensity of detected light, an illumination lens for illuminating light onto the image pickup device and a holding member for holding the illumination lens, having a light source for generating light, a position detecting section for detecting relative position of the image pickup device with respect to the illumination lens based on the output signal outputted out of the image pickup device corresponding to the light received from the light source via the illumination lens, a moving section for changing the relative position of the image pickup device to position set in advance by moving at least one of the image pickup device and the holding member holding the illumination lens based on the relative position detected by the position detecting section and an attaching section for attaching the image pickup device to the holding member while retaining the relative position of the image pickup device at the position set in advance.

According to a fifth aspect of the invention, there is provided a testing apparatus for testing optical characteristics of an image pickup device in which a plurality of photo-detecting elements is disposed on its photo-detecting plane, having a short focal distance lens that has optical characteristics of short focal distance corresponding to each micro-lens for illuminating light to the plurality of photo-detecting elements, whose optical axis is disposed in a direction of a vertical axis that crosses at right angles with the photo-detecting plane of the image pickup device and that inputs received and refracted parallel rays to the photo-detecting plane of the image pickup device, a stage movable in three axial directions while retaining the short focal distance lens and a position detection apparatus for detecting relative position that presents relative misalignment of center position of the plurality of photo-detecting elements and the optical axis of the short focal distance lens from levels of output signals of the plurality of photo-detecting elements by receiving the output signals outputted out of the image pickup device by the rays inputted from the short focal distance lens to the photo-detecting plane of the image pickup device, wherein the short focal distance lens is moved in a direction in which the relative misalignment of the center of the plurality of photo-detecting elements and the optical axis of the short focal distance lens is eliminated based on the relative position detected by the position detection apparatus.

The testing apparatus may further include a test head for mounting the image pickup device, a parts conveying unit for conveying the image pickup device to mount on the test head, a socket that electrically connects with electrical terminals of the image pickup device mounted on the test head and a signal input/output section for feeding a control signal from the testing apparatus to the image pickup device and for feeding an output signal of the image pickup device to the testing apparatus via the socket.

The testing apparatus may further include a slit section having an opening that transmits the parallel rays to be incident on the short focal distance lens while blocking a part thereof and the position detection apparatus may detect the relative position presenting the relative misalignment of center position of the plurality of photo-detecting elements and the optical axis of the short focal distance lens from levels of output signals of the plurality of photo-detecting elements by receiving the output signal of the image pickup device corresponding to an image of the opening projected onto the photo-detecting plane of the image pickup device based on the opening.

It is noted that the summary of the invention described above does not necessarily describe all necessary features of the invention. The invention may also be a sub-combination of the features described above.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
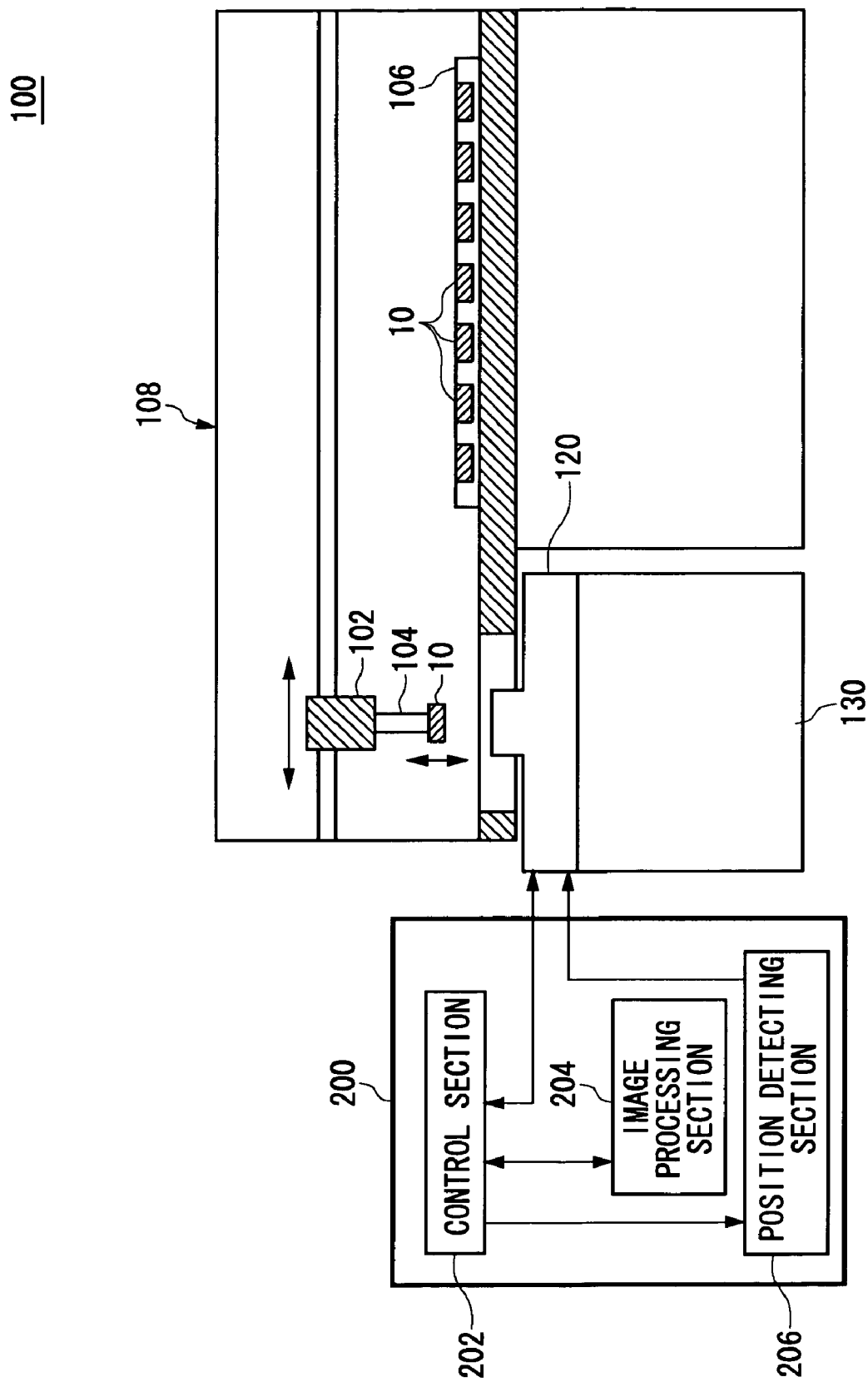
FIG. 1 shows one exemplary configuration of a testing apparatus according to one embodiment of the invention.

FIG. 1 shows one exemplary configuration of a testing apparatus 100 according to one embodiment of the invention. The testing apparatus 100 has parts conveying unit 108, an illumination unit 130, a test head 120 and a control unit 200. The testing apparatus 100 tests optical characteristics of an image pickup device 10 at high precision by detecting and adjusting position of the image pickup device 10 in which a plurality of photo-detecting elements is disposed on its photo-detecting plane. The parts conveying unit 108 has a tray 106, a moving section 102 and a parts holding section 104. The plurality of image pickup devices 10 to be tested is mounted on the tray 106. The moving section 102 moves the parts holding section 104 between the tray 106 and the test head 120. The parts holding section 104 takes one image pickup device 10 to be tested out of the tray 106 one by one and mounts it on the test head 120. Here, the image pickup device 10 to be mounted on the test head 120 is not always mounted accurately at predetermined position. That is, the image pickup device 10 is possibly mounted in such manner that a center o (see FIG. 2) of the image pickup device 10 is slightly misaligned from an optical axis of a short focal distance lens 126 (see FIG. 4). The illumination unit 130 illuminates light to the image pickup device 10 mounted on the test head 120.

The image pickup device 10 to be tested is mounted on the test head 120 and is electrically connected with the test head 120. The test head 120 also sends the output signal outputted out of the image pickup device 10 based on the received light to the control unit 200. The test head 120 also adjusts the position of the image pickup device 10 based on a control signal from the control unit 200.

The control unit 200 has a control section 202, a position detecting section 206 and an image processing section 204. The control section 202 receives the output signal of the image pickup device 10 via the test head 120 and converts it into pixel values (value of each pixel in an image) to generate image data. Then, the control section 202 sends the generated image data to the image processing section 204 and the position detecting section 206. Based on the image data received from the control section 202, the position detecting section 206 detects the position of the image pickup device 10. Then, the position detecting section 206 feeds the control signal based on the detected position of the image pickup device 10 to the test head 120.

Based on the image data received from the control section 202, the image processing section 204 performs a plurality of tests such as detection of defect and unevenness and sends the test result to the control section 202. The control section 202 receives the test result based on the image data from the image processing section 204 and judges whether or not the image pickup device 10 is defect-free. The control section 202 also feeds a control signal for controlling the test head 120. It is noted that the control section 202 is one example of the judging section.

Thus, the testing apparatus 100 takes one image pickup device 10 to be tested out of the tray 106 one by one, mounts it on the test head 120 and makes the image pickup device 10 output the output signal based on the light illuminated by the illumination unit 130. Then, the position detecting section 206 detects the position of the image pickup device 10 based on the image data received from the control section 202. The test head 120 adjusts the position of the image pickup device 10 by receiving the control signal that is based on the position of the image pickup device 10. The control section 202 converts the output signal from the image pickup device 10 whose position has been adjusted into image data and causes the image processing section 204 to detect defect, unevenness and others of the image pickup device 10. Thereby, the testing apparatus 100 judges whether or not the image pickup device 10 is defect-free.

Figure 2:
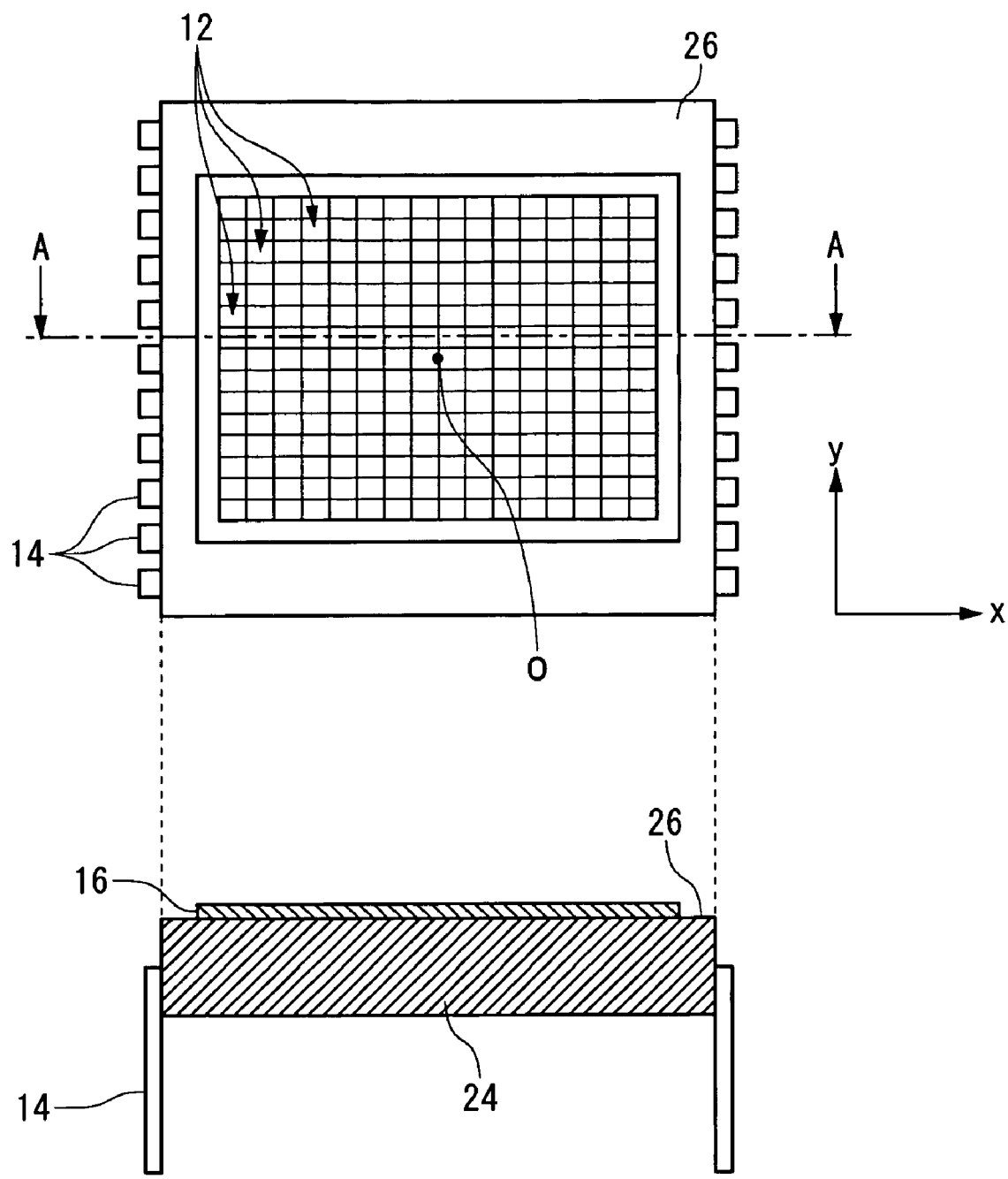
FIG. 2 shows one exemplary configuration of an image pickup device.

FIG. 2 shows one exemplary configuration of an image pickup device 10. The image pickup device 10 has a plurality of photo-detecting elements 12, a substrate 24, a cover glass 16 and a plurality of terminals 14. The plurality of photo-detecting elements 12 is manufactured by using a semiconductor manufacturing process for example and is formed on a photo-detecting plane 26 that is one plane of the substrate 24. In this example, the respective photo-detecting elements 12 are formed in grid arranged in x- and y-axis directions of the photo-detecting plane 26. Each of the photo-detecting elements 12 outputs an output signal corresponding to intensity of detected light. It is noted that a center o indicates the center of the array of the plurality of photo-detecting elements 12. Still more, while the photo-detection signals of the plurality of photo-detecting elements 12 are sequentially read based on a shift clock and are outputted as a serial photo-detection signal string, it is possible to specify a photo-detection signal outputted out of the photo-detecting element 12 corresponding to the center position o.

The cover glass 16 faces to the photo-detecting plane 26 so as to cover the plurality of photo-detecting elements 12 while holding the plurality of photo-detecting elements 12 therebetween. The plurality of terminals 14 is provided on the side planes of the substrate 24 and outputs the output signal of the photo-detecting element 12 to the outside. The image pickup device 10 of this example outputs signals presenting an image projected onto the photo-detecting plane 26 by outputting the signals based on the light illuminated to the photo-detecting plane 26.

Figure 3:
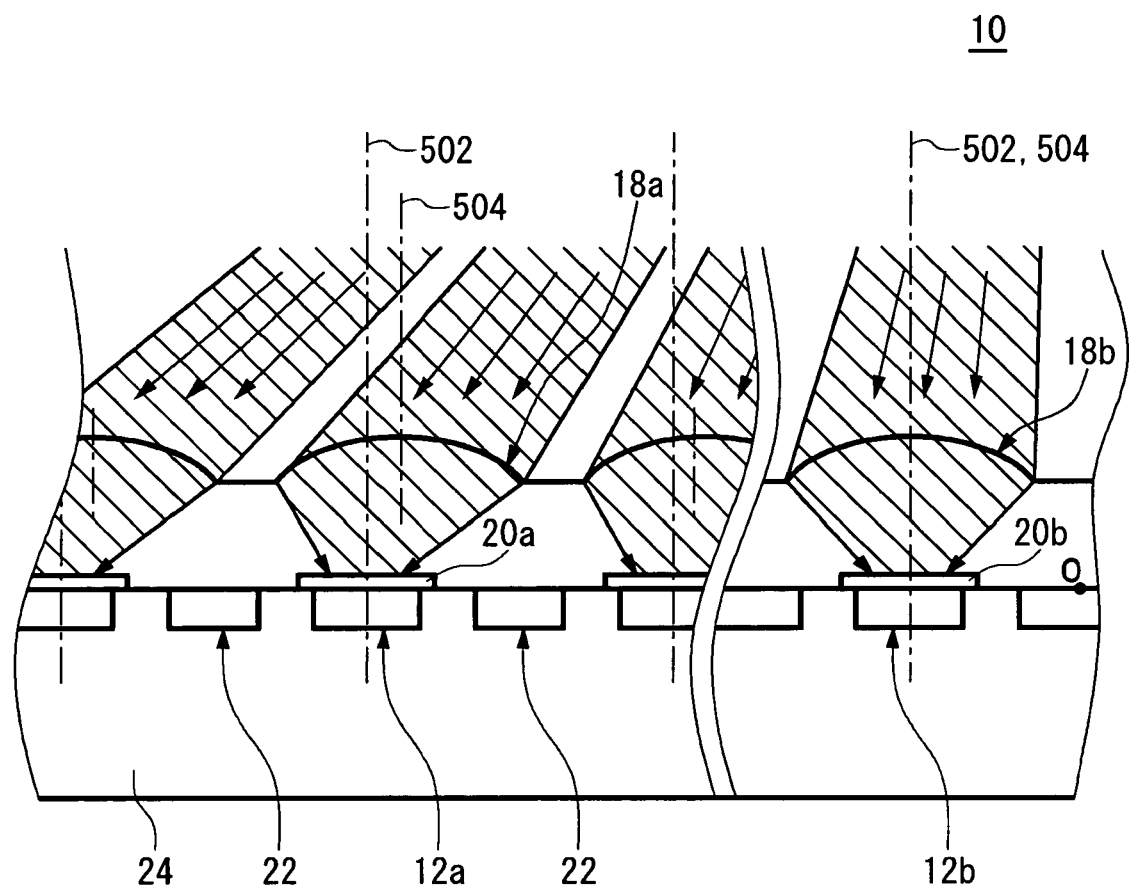
FIG. 3 is a section view showing one detailed exemplary configuration of the image pickup device.

FIG. 3 is a section view showing one detailed exemplary configuration of the image pickup device 10. The image pickup device 10 further includes a plurality of signal transfer circuits 22, a plurality of micro-lenses 18 and a plurality of color filters 20. The signal transfer circuit 22 transfers the output signal of each photo-detecting element 12 to the terminal 14. Each micro-lens 18 is provided in correspondence to each photo-detecting element 12 and condenses light entering the cover glass 16 onto the corresponding photo-detecting element 12.

Here, the micro-lens 18a corresponds to the photo-detecting element 12a and the micro-lens 18b corresponds to the photo-detecting element 12b, respectively. The photo-detecting element 12a is distant from the center o of the image pickup device 10 more than the photo-detecting element 12b. The micro-lens 18a is formed so that a distance between a center axis 502 of the photo-detecting element 12a and an optical axis 504 of the micro-lens 18a is larger than a distance between a center axis 502 of the photo-detecting element 12b and an optical axis 504 of the micro-lens 18b. The micro-lens 18 may be formed so that the center axis 502 of the photo-detecting element 12 is distant from the optical axis 504 corresponding to the distance between the center axis 502 of the photo-detecting element 12 and the center o. In this case, the micro-lens 18 may be formed so that the optical axis 504 of the micro-lens 18 corresponding to the photo-detecting element 12 deviates in the direction of the center o more than the center axis 502 of the photo-detecting element 12.

Thus, each micro-lens 18 has the optical axis 504 at the position deviating to the inside from the center axis 502 of the corresponding photo-detecting element 12 as the corresponding photo-detecting element 12 is distant from the center o, i.e., the center of array of the plurality of photo-detecting elements 12.

Here, with the late miniaturization of camera, a short focal distance lens whose focal distance is shorter than that of a conventional lens is used. When the lens provided on the image pickup device 10 projects light onto the image pickup device 10 having the center o on the optical axis of the lens and when the distance between the lens and the image pickup device 10 is short, an angle of the incident light on each photo-detecting element 12 with respect to the optical axis of the lens becomes large as the light is distant from the center o. Therefore, each micro-lens 18 of this example is designed to condense the light adequately onto the corresponding photo-detecting element 12 when it receives the light via the short focal distance lens.

The color filter 20 is provided in correspondence to each photo-detecting element 12 and is disposed between the corresponding micro-lens 18 and the photo-detecting element 12. Each color filter 20 transmits a specific color. Then, the color filters 20 having different colors are disposed periodically on the image pickup device 10. Thereby, the image pickup device 10 can reproduce colors of an object-to-be-picked up.

Figure 4:
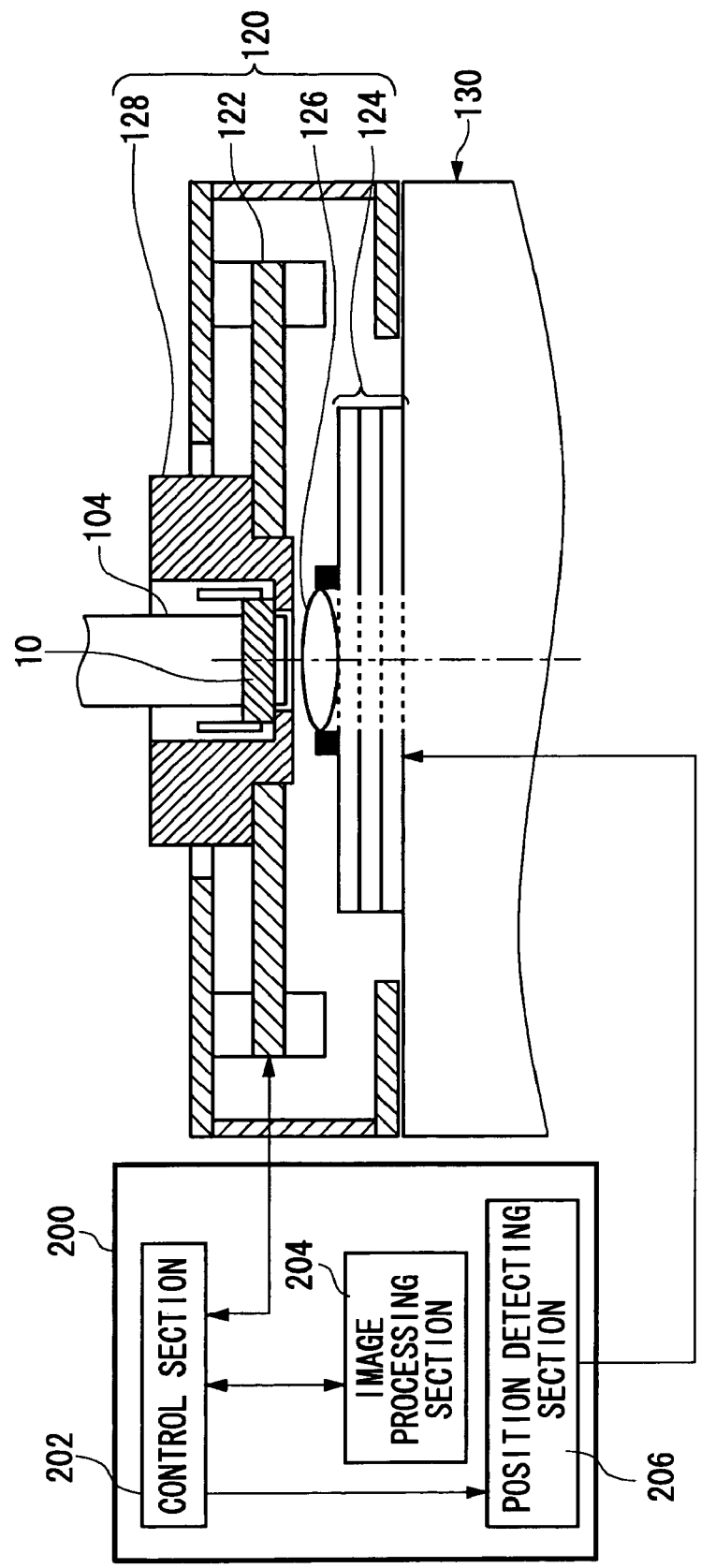
FIG. 4 shows one detailed exemplary configuration of a test head.

FIG. 4 shows one detailed exemplary configuration of the test head 120. The test head 120 has a socket 128, a signal input/output section 122, a position adjusting section 124 and a short focal distance lens 126. The image pickup device 10 is mounted on the socket 128 and is electrically connected therewith. The socket 128 is also electrically connected with the signal input/output section 122 to send a control signal received from the signal input/output section 122 to the image pickup device 10 and to send an output signal received from the image pickup device 10 to the signal input/output section 122.

The signal input/output section 122 receives the output signal of the image pickup device 10 via the socket 128, sequentially converts the output signal of one frame of all photo-detecting elements 12 into a digital signal by an AD (Analog-to-Digital) converter for example and sends the converted data signal to the control section 202 as image data. It is noted that the AD converter is not necessary when the AD converter is built in the image pickup device 10. Here, a pre-processing may be added in the control section 202 if measuring random error, noise and other of the measuring system need to be removed. That is, it is possible to arrange so as to receive image data in unit of a plurality of frames and to utilize resultant data obtained by averaging process as image data. It is noted that middle position of a data string of the image data may be specified as data of the center o for example, though it is different depending on designed specification of the image pickup device 10. Still more, position of the photo-detecting element arrayed at each position may be specified because it corresponds to position of the image data. The signal input/output section 122 sends the control signal received from the control section 202 to the image pickup device 10 via the socket 128. It is noted that the photo-detection signal of the plurality of photo-detecting elements 12 is sequentially read by shift clock that is one of the control signal from the image pickup device 10, the AD converter can synchronize and quantize the signal by applying the shift clock.

The short focal distance lens 126 is designed so as to be able to correspond to the plurality of micro-lenses 18 and has optical characteristics of short focal distance corresponding to the plurality of micro-lenses 18 for illuminating light to each of the plurality of photo-detecting elements 12. Accordingly, the short focal distance lens 126 may be replaced to one having corresponding focal distance every time when the type of the image pickup device 10 changes. The short focal distance lens 126 is disposed in the direction of a vertical axis whose optical axis is orthogonal to the photo-detecting plane of the image pickup device 10. The short focal distance lens 126 is one example of an illumination lens used when the illumination unit 130 illuminates the illumination light onto the image pickup device 10. The position adjusting section 124 is a X/Y/Z stage movable in the three axial directions while holding the short focal distance lens 126 for example and has a hole for transmitting light approximately at the center of the stage. It is noted that the position adjusting section 124 is one example of a moving section.

The position detecting section 206 receives the image data based on the output signal of the image pickup device 10 via the control section 202 and detects relative position of the image pickup device 10 and the short focal distance lens 126 based on the image data. More specifically, the short focal distance lens 126 receives the output signal outputted out of the image pickup device 10 in correspondence to the rays incident on the photo-detecting plane of the image pickup device 10 from the short focal distance lens 126 and detects the relative position that indicates relative misalignment of the center position of the plurality of photo-detecting elements 12 and the optical axis of the short focal distance lens 126 from the levels of the output signals of the plurality of photo-detecting elements 12. Then, the position detecting section 206 feeds a control signal based on the relative position to the position adjusting section 124. The position adjusting section 124 adjusts the relative position of the image pickup device 10 and the short focal distance lens 126 to adequate position by moving the short focal distance lens 126 corresponding to the received control signal. More specifically, the position adjusting section 124 moves the short focal distance lens 126 in the direction in which the relative misalignment of the center position of the plurality of photo-detecting elements 12 and the optical axis of the short focal distance lens 126 is eliminated based on the relative position presenting the relative misalignment of the center position of the plurality of photo-detecting elements 12 and the optical axis of the short focal distance lens 126 detected by the position detecting section 206.

Figure 5:
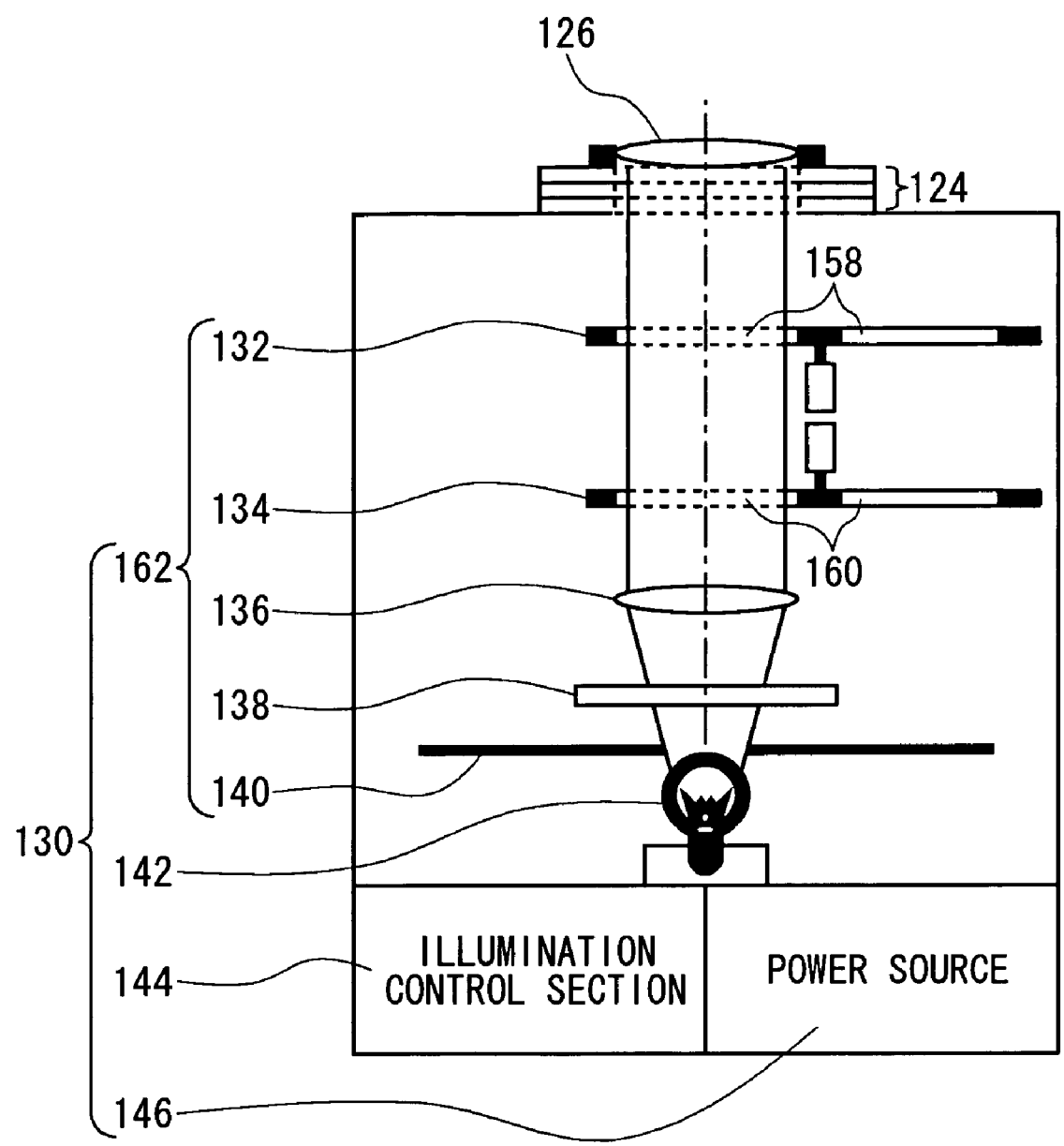
FIG. 5 shows one detailed exemplary configuration of the illumination unit.

FIG. 5 shows one detailed exemplary configuration of the illumination unit 130. The illumination unit 130 has a power supply 146, a light source 142, an illumination control section 144 and an illuminating optical system 162. The power supply 146 feeds electric power to the illumination control section 144. The light source 142 is a halogen lamp or LED (light emitting diode) and emits white light. The illumination control section 144 feeds certain electric power to the light source 142. The illumination control section 144 controls the illuminating optical system 162.

The illuminating optical system 162 has an iris 140, a diffuser plate 138, a collimator lens 136, a ND (Neutral Density) filter section 134 and a color filtering section 132. The iris 140 shapes the light emitted from the light source 142. The diffuser plate 138 converts the intensity of light shaped by the iris 140 into the unform distribution. The collimator lens 136 transforms the light transmitted through the diffuser plate 138 into rays parallel to an optical axis of the illuminating optical system 162. The short focal distance lens 126 receives the parallel rays from the collimator lens 136 via the color filtering section 132 and the ND filtering section 134, refracts the collimated parallel rays and inputs the refracted rays to the photo-detecting plane of the image pickup device 10.

The ND filtering section 134 is almost round and is turnably held. The ND filtering section 134 has a plurality of ND filters 160 that has different attenuation, respectively. Each ND filter 160 adjusts brightness of the light incident on the image pickup device 10 by uniformly reducing the intensity of transmitting light across the whole range of wavelength. The ND filtering section 134 may be driven and turned by a motor for example to replace the ND filter 160 that transmits the light that has transmitted through the collimator lens 136.

The color filter section 132 is almost round and is turnably held. The color filtering section 132 has a plurality of color filters 158 that transmits light of different waveforms, respectively. The color filter 158 converts the white light emitted from the light source 142 into red, green or blue light to illuminate to the image pickup device 10. The color filtering section 132 may be driven and turned by a motor for example to replace the color filter 158 that transmits the light emitted from the light source 142. It is noted that light that has not transmitted through the color filter 158 is illuminated to the image pickup device 10 in aligning position.

Thus, the illumination unit 130 of this example allows the light emitted from the light source 142 to be transformed into the light whose distribution of intensity is uniform and which is almost parallel to the optical axis of the light source 142 and to be adequately inputted to the short focal distance lens 126. Still more, the testing apparatus 100 can perform various image quality tests on the image pickup device 10 by selecting the color filter 158 and the ND filter 160 that transmit the light by the illumination unit 130. It is noted that the position detecting section 206, the short focal distance lens 126 and the illumination unit 130 are one example of a position detection apparatus for detecting the position of the image pickup device 10.

Figure 6:
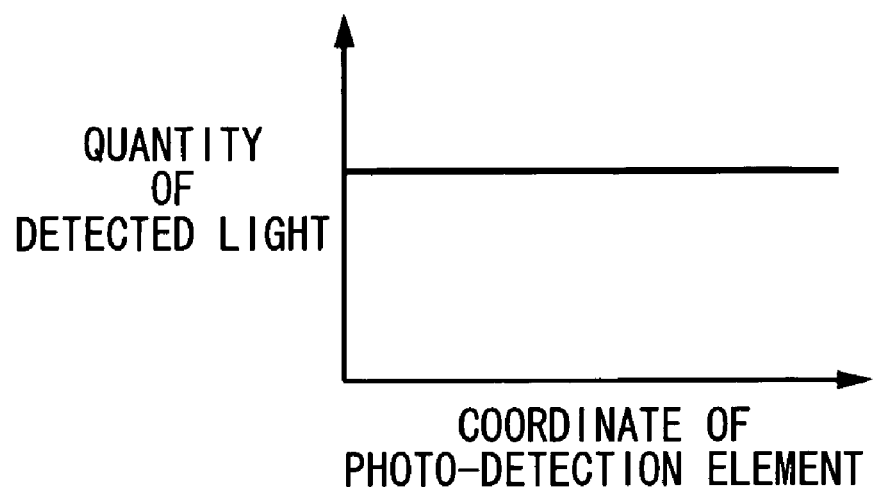
FIG. 6 is a conceptual drawing showing a distribution of quantity of detected light of the image pickup device when a center of the image pickup device coincides with an optical axis of a short focal distance lens.
Figure 6:
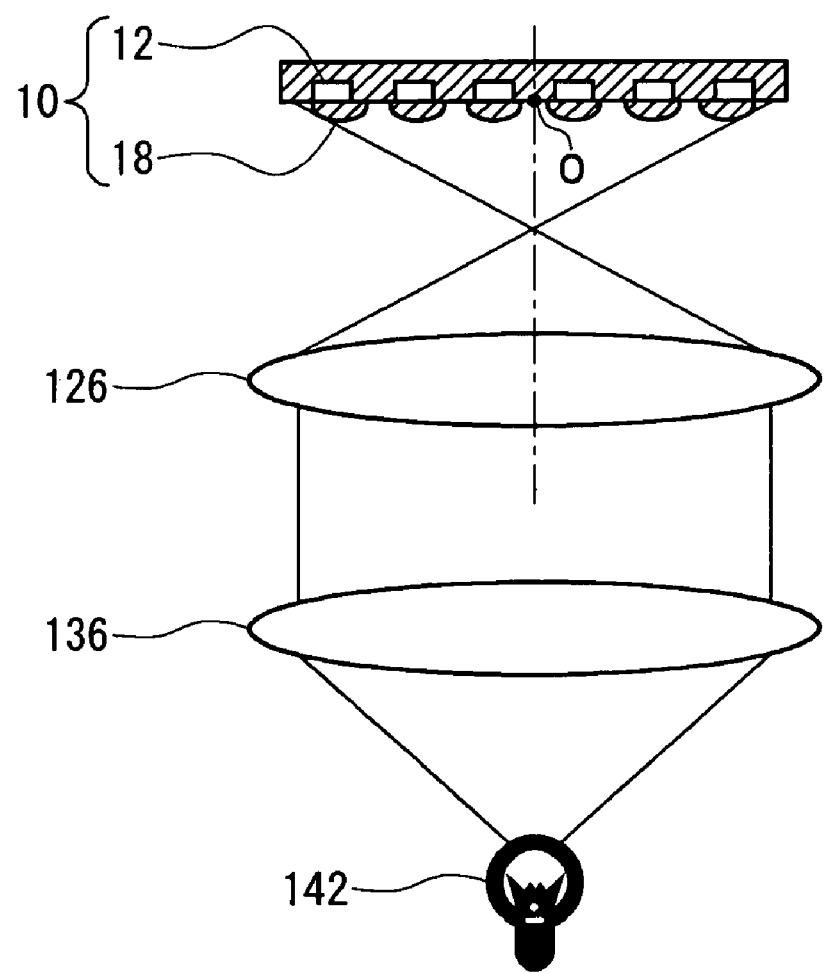

FIG. 6 is a conceptual drawing showing a distribution of quantity of detected light of the image pickup device 10 when the center o of the image pickup device 10 coincides with the optical axis of the short focal distance lens 126. The short focal distance lens 126 receives the light transmitted through the collimator lens 136 and illuminates it onto the image pickup device 10. Because each micro-lens 18 has its optical axis respectively at position deviating to the inside from the center of the corresponding photo-detecting element 12 as the corresponding photo-detecting element 12 is distant from the center of the image pickup device 10 corresponding to the short focal distance lens 126, a quantity of light detected by each photo-detecting element 12 is almost equal when the center o of the image pickup device 10 coincides with the optical axis of the short focal distance lens 126.

Figure 7:
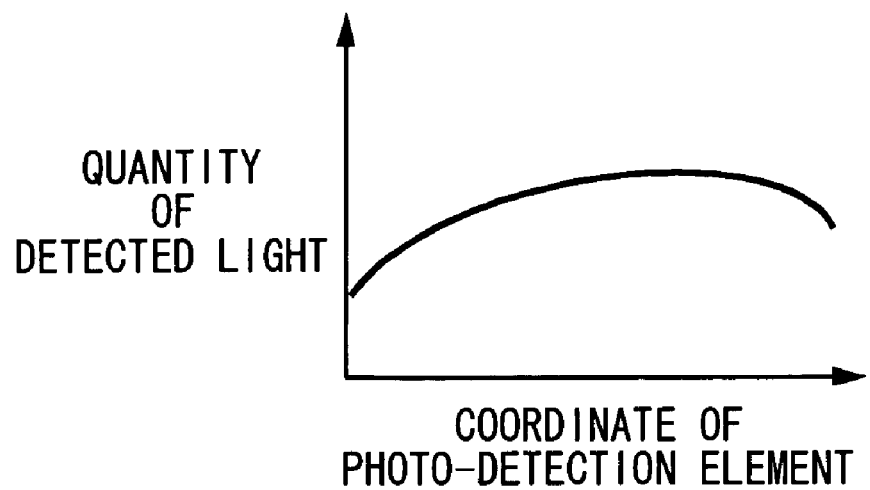
FIG. 7 is a conceptual drawing showing a distribution of quantity of detected light of the image pickup device when the center of the image pickup device is misaligned from the optical axis of the short focal distance lens.
Figure 7:
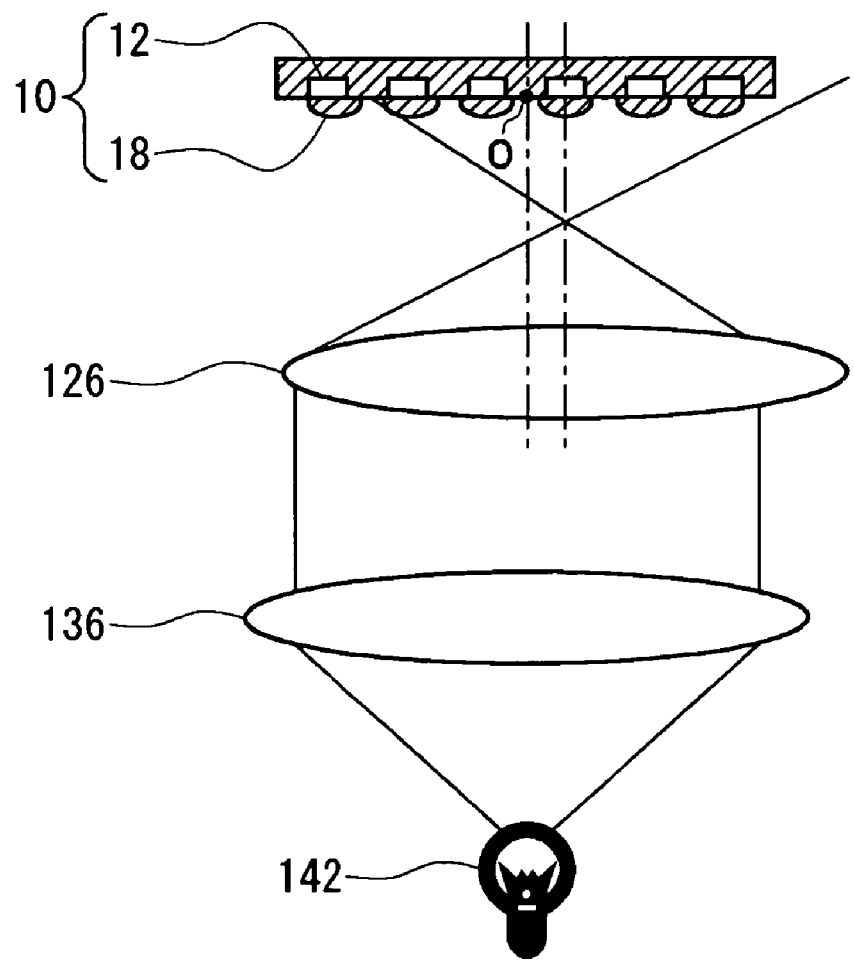

FIG. 7 is a conceptual drawing showing a distribution of quantity of detected light of the image pickup device 10 when the center o of the image pickup device 10 is misaligned from the optical axis of the short focal distance lens 126. The plurality of micro-lenses 18 is designed so that the quantity of light detected by each photo-detecting element 12 is almost equalized when the center o coincides with the optical axis of the short focal distance lens 126. Therefore, when the center o is misaligned from the optical axis of the short focal distance lens 126, the quantity of light detected by each photo-detecting element 12 is not equalized. In this case, the greater the deviation of the center o and the optical axis of the short focal distance lens 126, the greater the dispersion of the quantity of detected light of the image pickup device 10 becomes. Still more, as the center o is misaligned from the optical axis of the short focal distance lens 126, a maximum value of the quantity of detected light deviates in the direction in which the optical axis of the short focal distance lens 126 is misaligned from the center o.

Here, the position detecting section 206 calculates the dispersion of the quantity of detected light based on the output signal of the image pickup device 10. When the dispersion is greater than a predetermined value, the position detecting section 206 judges that the center o is misaligned from the optical axis of the short focal distance lens 126. Then, the position detecting section 206 detects coordinates of a pixel wherein a quantity of detected light is maximized on the image pickup device 10. The position detecting section 206 detects the relative position of the center o and the short focal distance lens 126 by calculating a distance from that coordinates to the center o.

In this case, the position detecting section 206 calculates the relative position by dividing into a distance dx in the direction of the x-axis and a distance dy in the direction of the y-axis on the photo-detecting plane 26 of the image pickup device 10, respectively. Then, the position detecting section 206 causes the position adjusting section 124 to move the short focal distance lens 126 with respect to the image pickup device 10 by feeding the control signal based on the distances dx and dy to the position adjusting section 124.

Thus, the position detecting section 206 detects the relative position of the short focal distance lens 126 with respect to the image pickup device 10 based on the output signal outputted out of the image pickup device 10 in correspondence to the light received via the short focal distance lens 126. Based on the relative position detected by the position detecting section 206, the position adjusting section 124 moves the short focal distance lens 126 in parallel within a plane vertical to the optical axis of the short focal distance lens 126 to change the relative position of the image pickup device 10 to the short focal distance lens 126 to position set in advance. In this example, the position adjusting section 124 moves the short focal distance lens 126 with respect to the image pickup device 10 so that the center o of the image pickup device 10 coincides with the optical axis of the short focal distance lens 126.

Because the position adjusting section 124 adjusts the optical axis of the short focal distance lens 126 based on the output signal of the image pickup device 10 actually receiving the light, it can accurately detect the relative position of the optical axis of the short focal distance lens 126 and the center o of the image pickup device 10 and can adjust them. Accordingly, it can test the image pickup device 10 at high precision.

It is noted that the position detecting section 206 may calculate the deviation of the optical axis of the short focal distance lens 126 and the center o of the image pickup device 10 based on magnification m of the short focal distance lens 126, in addition to the distances dx and dy in the image data. In this case, the deviation in the direction parallel to the x-axis is a product of the magnification m and the distance dx and the deviation in the direction parallel to the y-axis is a product of the magnification m and the distance dy. Still more, the coordinates of the pixel in the image data correspond to coordinates indicating position of each photo-detecting element 12 on the photo-detecting plane 26 of the image pickup device 10.

Figure 8:
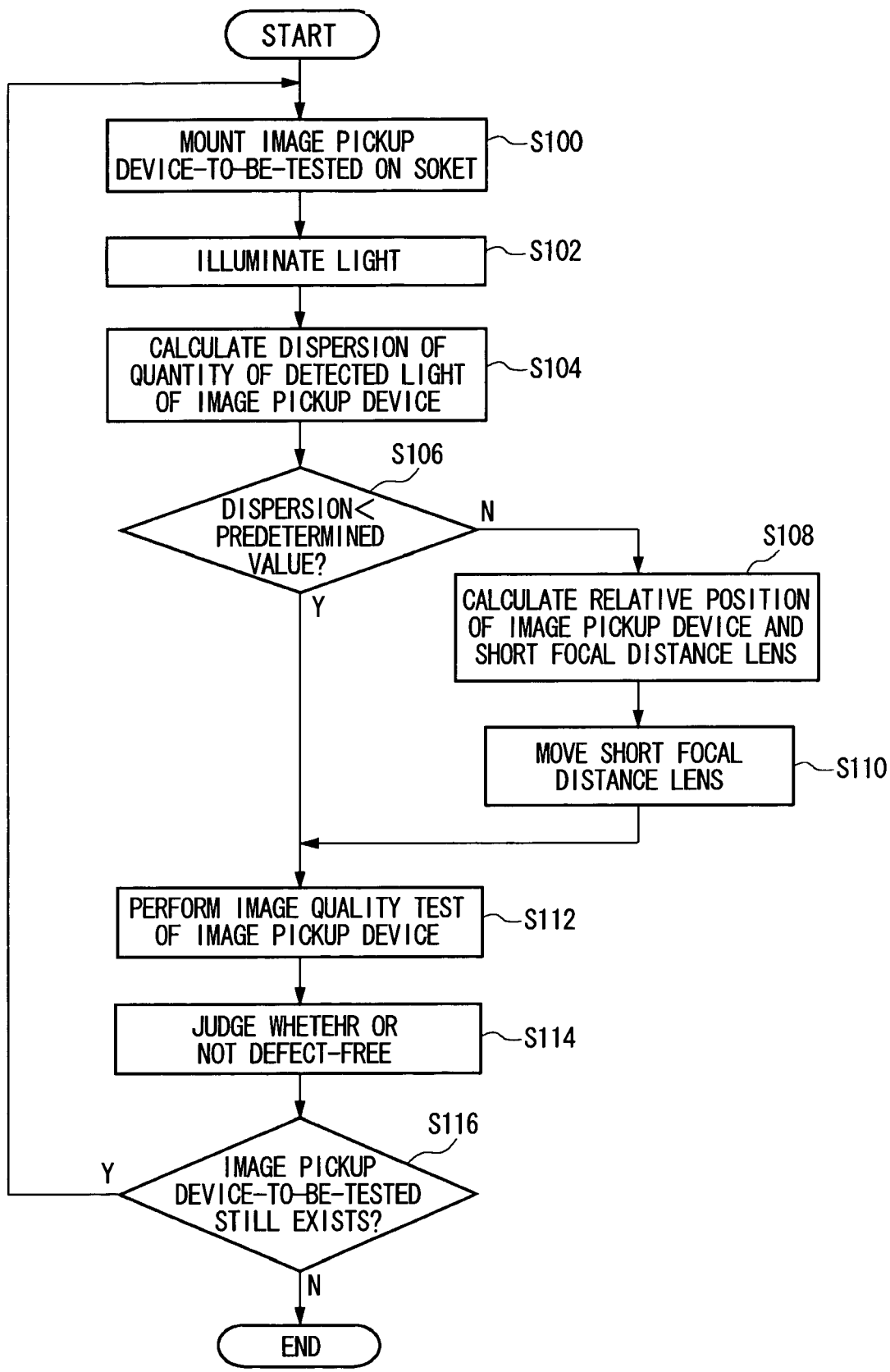
FIG. 8 is a flowchart showing one exemplary testing procedures of the image pickup device.

FIG. 8 is a flowchart showing one exemplary testing procedures of the image pickup device 10. At first, the parts conveying unit 108 takes on image pickup device 10 to be tested out of the tray 106 and mounts it on the socket 128 in Step S100. Next, the light source 142 is turned on and the light emitted from the light source 142 is illuminated to the image pickup device 10 via the illuminating optical system 162 and the short focal distance lens 126 in Step S102. Then, the control section 202 transforms the output signal of the image pickup device 10 corresponding to the quantity of detected light of the illuminated light into a pixel value to generate image data and sends it to the image processing section 204 and the position detecting section 206. Based on the received image data, the position detecting section 206 calculates dispersion of the quantity of detected light of the image pickup device 10 in Step S104.

The position detecting section 206 compares the calculated dispersion of the quantity of detected light with a predetermined value in Step S106. Firstly, when the position detecting section 206 judges that the dispersion of the quantity of detected light is smaller than the predetermined value i.e., Yes in Step S106, it advances to Step S112. Secondly, when the position detecting section 206 judges that the dispersion of the quantity of detected light is larger than the predetermined value, i.e., No in Step S106, it calculates the relative position of the image pickup device 10 and the short focal distance lens 126 by comparing the position of the photo-detecting element 12 outputting the maximum value of the quantity of detected light with the position of the center o of the image pickup device 10 and sends the control signal corresponding to that relative position to the position adjusting section 124 in Step S108. Then, the position adjusting section 124 moves the short focal distance lens 126 corresponding to the received control signal in Step S110.

As a result of correction, the center o of the image pickup device 10 and the short focal distance lens 126 are positioned at the optimum position. It is noted that the maximum value may not be accurately specified when characteristic dispersion such as defects and unevenness of a degree not negligible exist in the image pickup device 10. Then, it may be arranged so as to detect envelopes in the x- and y-axis directions from the data string of image data, respectively, and to specify position indicating the maximum value out of a group of the detected envelopes.

Next, the image processing section 204 performs an image quality test for testing abnormalities such as defects and unevenness on the received image data and sends the test result to the control section 202 in Step S112. Based on the received test result, the control section 202 judges whether or not the image pickup device 10 is defect-free in Step S114. Then, the testing apparatus 100 judges whether or not the image pickup device 10 to be tested exists on the tray 106 in Step S116. When there remains the image pickup device 10 to be tested on the tray 106, i.e., Yes in Step S116, the parts conveying unit 108 takes one image pickup device 10 to be tested out of the tray 106 again and mounts it on the socket 128 in Step S100. When there remains no image pickup device 10 to be tested on the tray 106, i.e., No in Step S116, the operation of the testing apparatus 100 shown in this flow-chart ends.

The testing apparatus 100 may also adjust the position of the short focal distance lens 126 by using the golden image pickup device 10 having known characteristics and no defect nor unevenness to test a plurality of image pickup devices 10 to be tested by exchanging the golden image pickup device 10 with the image pickup device 10 to be tested. In this case, the testing apparatus 100 judges whether or not the image pickup device 10 is defect-free based on the output signal outputted out of the image pickup device 10 held at the position set in advance. Thereby, it is not necessary to adjust the position per each of the plurality of image pickup devices 10 to be tested and the test may be performed quickly.

Figure 9:
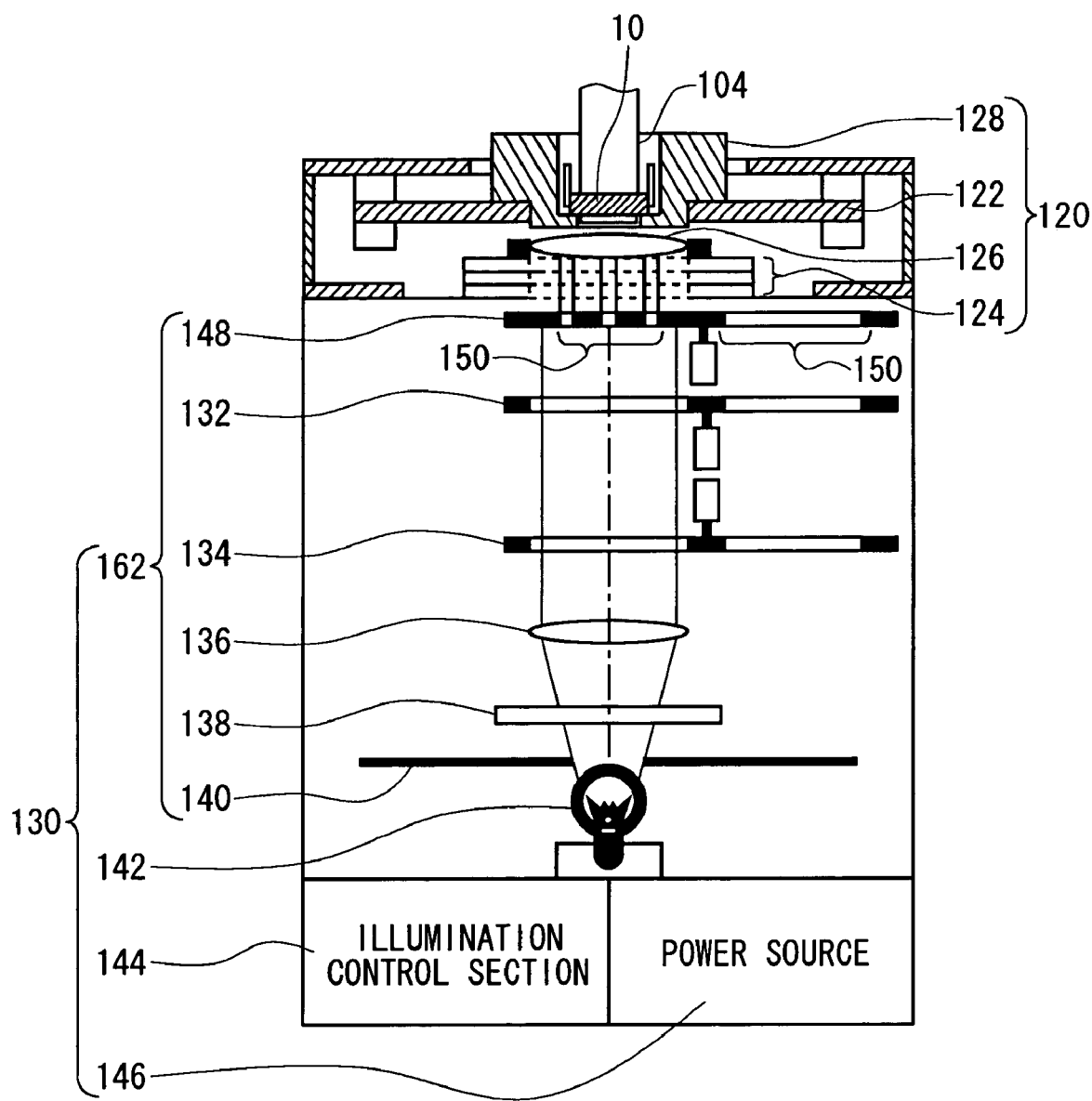
FIG. 9 shows another detailed exemplary configuration of the illumination unit.

FIG. 9 shows another detailed exemplary configuration of the illumination unit 130. It is noted that in FIG. 9, the components denoted by the same reference numerals with those in FIG. 4 or 5 have the same or similar functions with those in FIG. 4 or 5, so that their explanation will be omitted here, except of points described below.

The illumination unit 130 further includes a slit section 148. The slit section 148 is an almost round plate and is turnably held. The slit section 148 has a plurality of slits (openings) 150 that transmits the parallel rays generated by the light source 142 and incident on the short focal distance lens 126 via the collimator lens 136, while blocking a part thereof. The slit section 148 turns as it is driven by a motor for example to switch the slit 150 that transmits the part of the light generated by the light source 142. The short focal distance lens 126 projects an image of the slit 150 onto the image pickup device 10 by illuminating the light received from the slit 150 via the slit 150 of the slit section 148 onto the image pickup device 10. Then, the image pickup device 10 outputs an output signal presenting the projected image of the slit 150 to the position detecting section 206. Then, receiving the output signal of the image pickup device 10 corresponding to the image of the slit 150 projected on the photo-detecting plane of the image pickup device 10 based on the slit 150, the position detecting section 206 detects the relative position presenting the relative misalignment of the center position of the plurality of photo-detecting elements 12 and the optical axis of the short focal distance lens 126 from the levels of the output signals of the plurality of photo-detecting elements 12.

Figure 10:
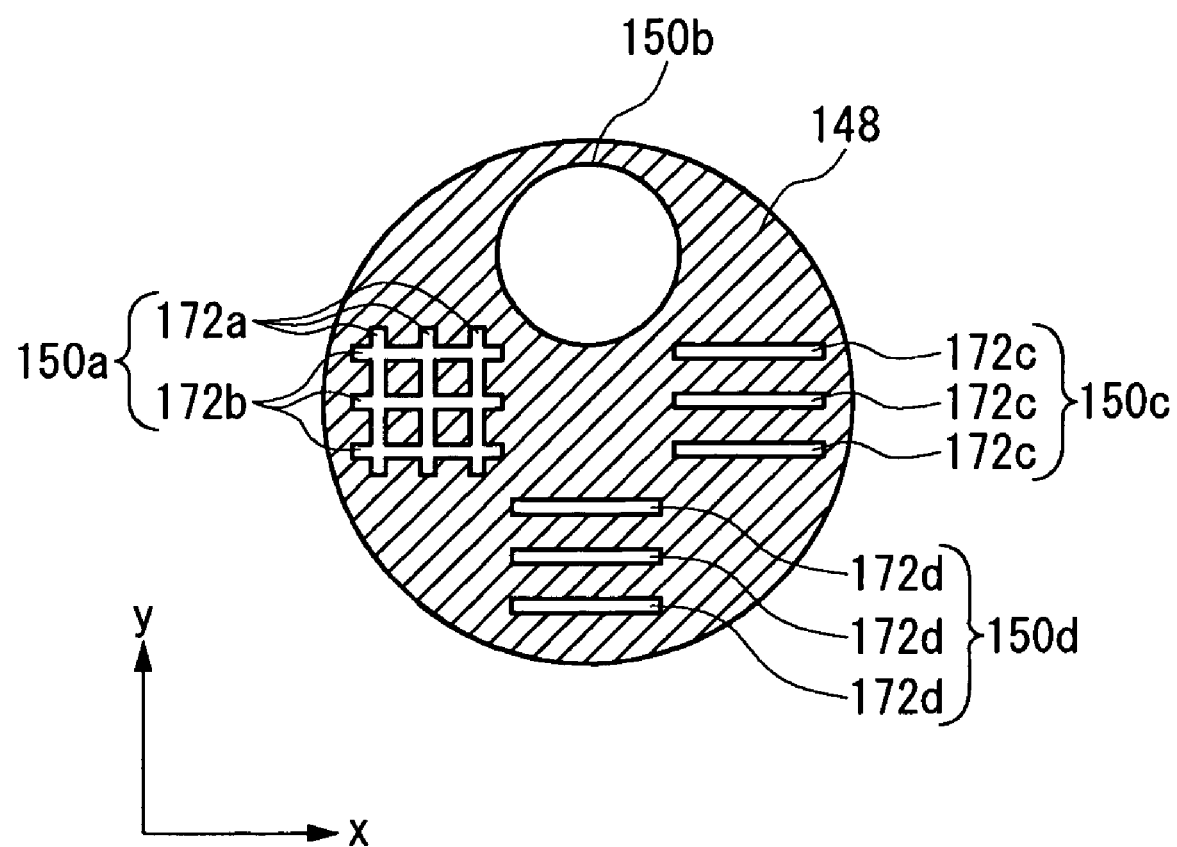
FIG. 10 shows one example of a slit section.

FIG. 10 shows one example of the slit section 148. The slit section 148 has a plurality of slits 150a through 150d. The slit 150a has a plurality of openings 172a parallel to each other and a plurality of openings 172b parallel to each other. Each of the openings 172a extends in the y-axis direction and is arrayed respectively in the x-axis direction that crosses at right angles with the y-axis direction. Each of the openings 172b extends in the x-axis direction and is arrayed in the y-axis direction. The slit 150b is circular. The slit 150c has a plurality of openings 172c parallel to each other. Each of the openings 172c extends in the x-axis direction and is arrayed respectively in the y-axis direction.

While the slit 150d has almost the same shape with the slit 150c, they cross at right angles from each other with respect to the radial direction of the slit section 148. Thereby, an image of each opening 172d projected on the image pickup device 10 crosses almost at right angles with respect to an image of each opening 172c projected on the image pickup device 10. It is noted that each slit 150 may be crossed or rectangular, beside them.

Here, the slit section 148 is provided within a plane almost vertical to the optical axis of the illuminating optical system 162. Still more, when the slit 150 transmits the part of the light from the light source 142, the center of the slit 150 may be aligned to the position overlapping with the optical axis of the illuminating optical system 162 and the short focal distance lens 126 by turning the slit section 148. Thereby, when the center o of the image pickup device 10 coincides with the optical axis of the short focal distance lens 126, the short focal distance lens 126 projects the image of the slit 150 approximately at the center of the photo-detecting plane 26 of the image pickup device 10.

Figure 11:
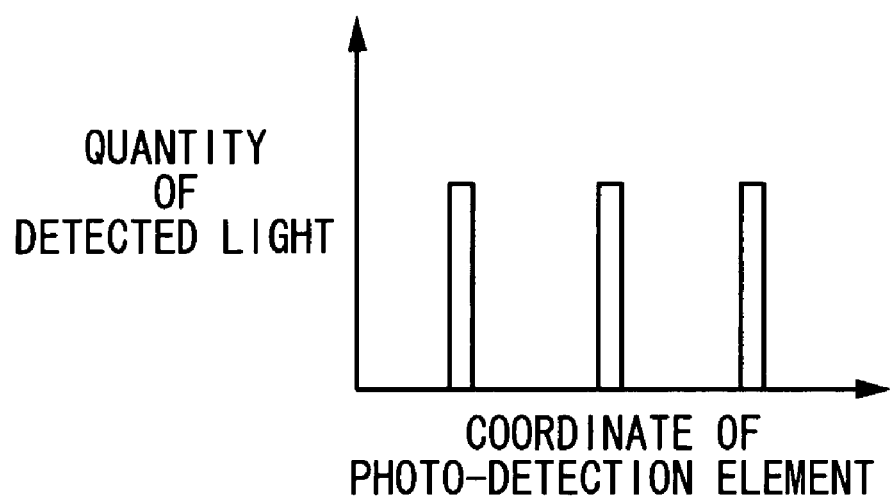
FIG. 11 is a conceptual drawing showing a distribution of quantity of detected light of the image pickup device when the center of the image pickup device coincides with the optical axis of the short focal distance lens.
Figure 11:
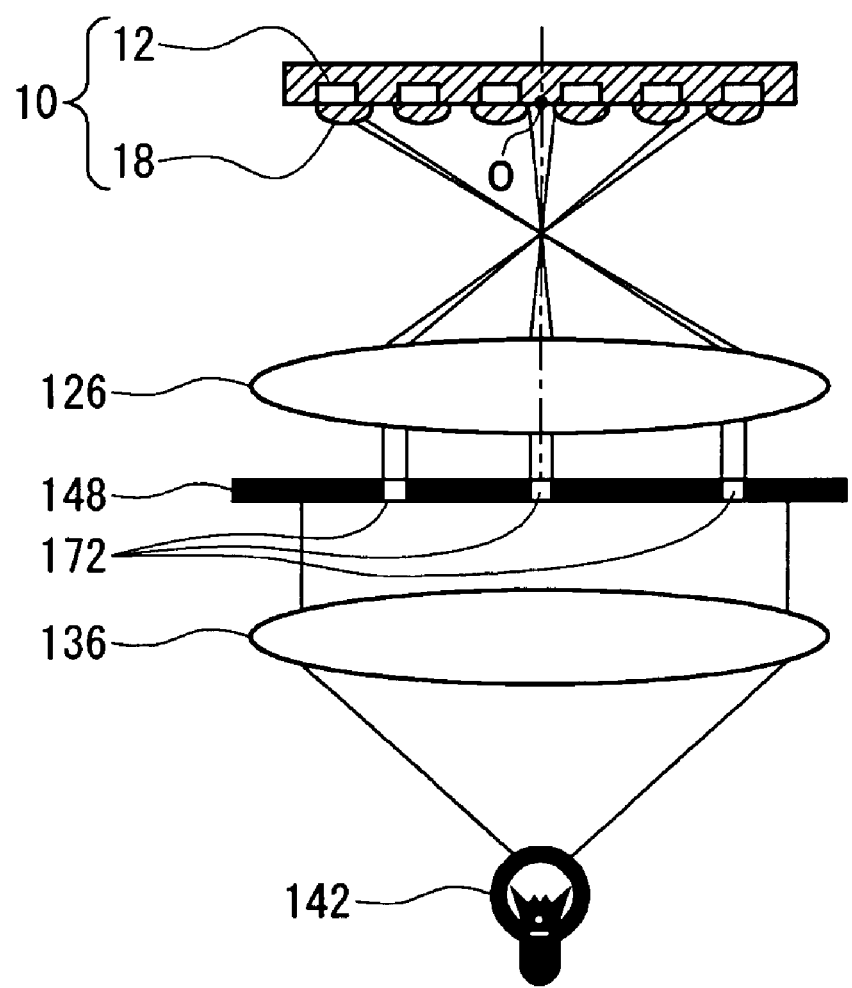

FIG. 11 is a conceptual drawing showing a distribution of quantity of detected light of the image pickup device 10 when the center o of the image pickup device 10 coincides with the optical axis of the short focal distance lens 126. In this example, the short focal distance lens 126 forms the respective images of the plurality of openings 172*c* corresponding to the slit 150*c* on the image pickup device 10. When the center o coincides with the optical axis of the short focal distance lens 126, the images of the respective openings 172*c* are projected respectively at predetermined positions on the photo-detecting plane 26 of the image pickup device 10.

In this case, the quantity of detected light of the plurality of photo-detecting elements 12 has a distribution corresponding to the shape of the respective slits 150. Still more, because the center o coincides with the optical axis of the short focal distance lens 126 at this time, the quantity of light received by each photo-detecting element 12 corresponding to each projected opening 172*c* becomes almost equal.

Figure 12:
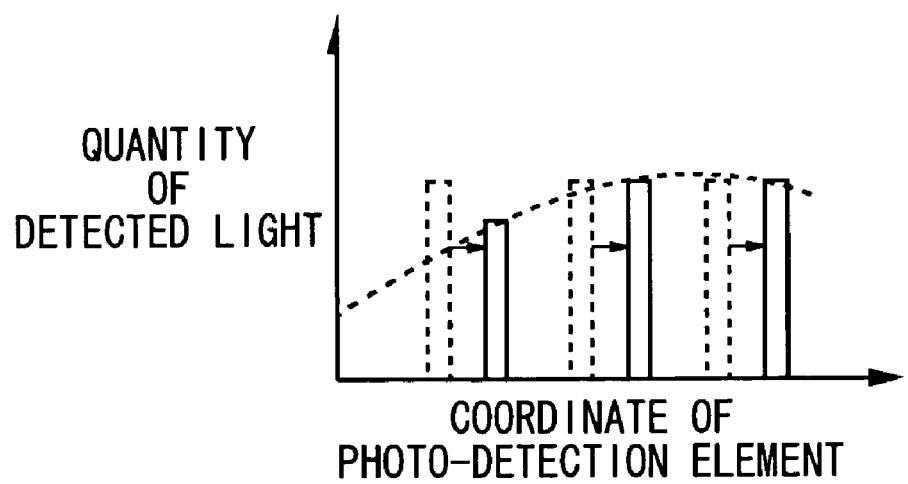
FIG. 12 is a conceptual drawing showing a distribution of quantity of detected light of the image pickup device when the center of the image pickup device is misaligned from the optical axis of the short focal distance lens.
Figure 12:
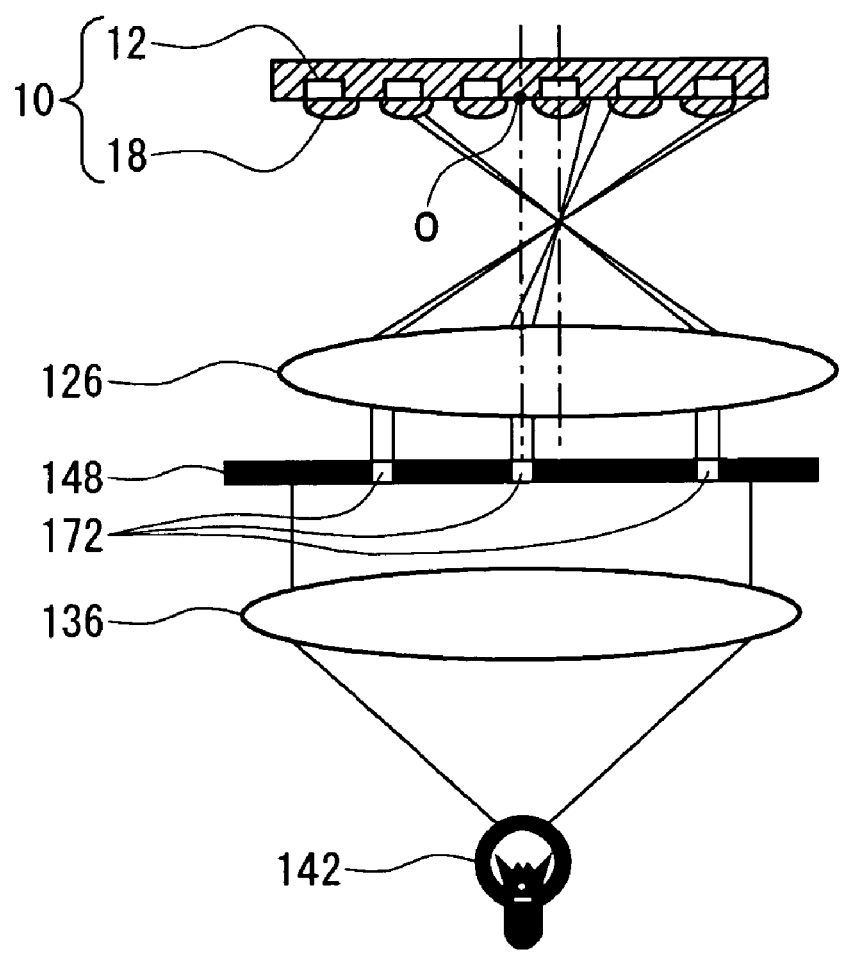

FIG. 12 is a conceptual drawing showing a distribution of quantity of detected light of the image pickup device 10 when the center o of the image pickup device 10 is misaligned from the optical axis of the short focal distance lens 126. When the center o is misaligned from the optical axis of the short focal distance lens 126, the shape of the respective opening 172 is projected at position deviating from the predetermined position on the photo-detecting plane 26. Because the plurality of micro-lenses 18 is designed so that the quantity of light received by the respective photo-detecting elements 12 is almost equalized when the center o coincides with the optical axis of the short focal distance lens 126, the quantity of light received by the respective photo-detecting elements 12 corresponding to the projected openings 172 becomes unequal if the center o is misaligned from the optical axis of the short focal distance lens 126.

Figure 13:
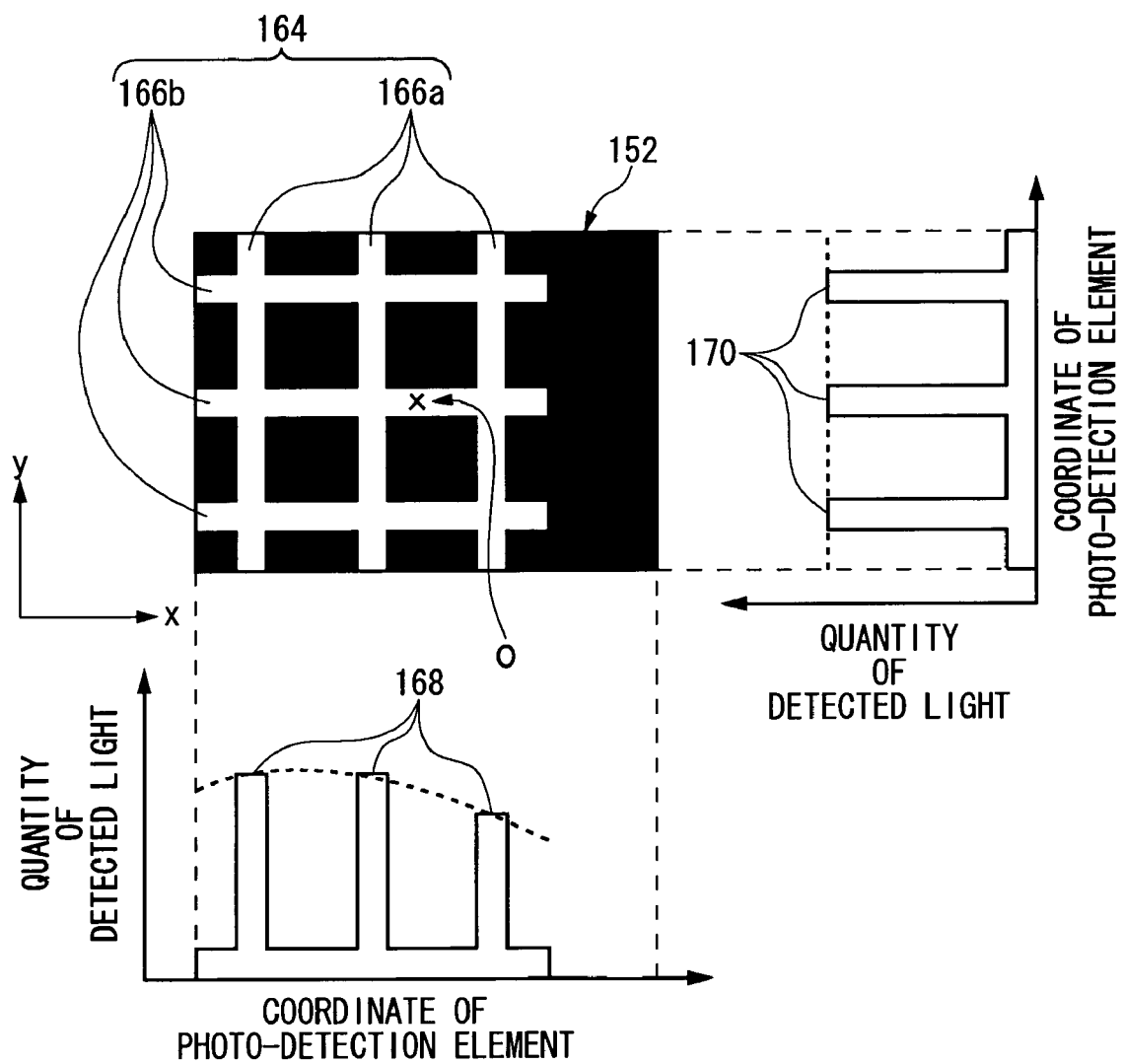
FIG. 13 shows an image pickup pattern and its one exemplary distribution of quantity of detected light.

FIG. 13 shows an image pickup pattern 152 and its one exemplary distribution of quantity of detected light. In this example, the short focal distance lens 126 projects the image of the slit 150*a* on the photo-detecting plane 26. An image 164 is the image of the slit 150*a* projected on the image pickup device 10 and has a plurality of bright portions 166*a* and 166*b*. The position detecting section 206 detects a clear image pickup pattern 152 from which data of useless dark portions other than the bright sections 166*a* and 166*b* is removed by comparing the output signal received from the respective photo-detecting elements 12 with the predetermined value and by zeroing the pixel value of the output signal less than a predetermined value. Here, a value of about 1/10 of data value of the bright portions 166*a* and 166*b* is applied as the predetermined value. It is noted that when the focus of the short focal distance lens 126 needs to be accurately adjusted to the image pickup device 10, the Z stage is used to find a Z-axis position of the short focal distance lens 126 where the profile of the bright portions 166*a* and 166*b* becomes sharpest in advance and a pre-processing for setting the short focal distance lens 126 to the Z-axis position is carried out.

In this example, the position detecting section 206 generates summation signals (added data strings) indicating that the pixel value of the image pickup pattern 152 is added respectively in the x- and y-axis directions, i.e., in the array directions of the plurality of photo-detecting elements 12. In the generated summation signals, the summation signals at the position corresponding to the bright portions 166*a* and 166*b* become large. Still more, because it also allows characteristic random error of each of the photo-detecting elements 12 to be averaged, the characteristics may be accurately judged.

Here, the position detecting section 206 detects the summation signals 168 and 170 corresponding respectively to the bright portions 166*a* and 166*b* by comparing the generated summation signals with the predetermined value. Then, the position detecting section 206 averages the pixel values within the respective summation signals 168 and 170. Then, the position detecting section 206 judges whether or not the quantity of detected light in the x-axis direction is equal by comparing the average values of the respective summation signals 168. Still more, the position detecting section 206 judges whether or not the quantity of detected light in the y-axis direction is equal by comparing the pixel values within the respective summation signals 170.

When the quantity of light in the x-axis direction is not uniform, the position detecting section 206 judges that the center o of the image pickup device 10 is misaligned from the optical axis of the short focal distance lens 126 in the x-axis direction. The position detecting section 206 also judges that the center o is misaligned from the optical axis of the short focal distance lens 126 in the y-axis direction when the quantity of light in the y-axis direction is not uniform. Here, the position detecting section 206 has a table storing the relationship between the distribution of pixel values of the respective summation signals 168 and the relative position of the center o and the optical axis of the short focal distance lens 126 measured in advance. Then, the position detecting section 206 detects the relative position in the x- and y-axis directions of the center o with the optical axis of the short focal distance lens 126 based on the distribution of the pixel values of the respective detected summation signals 168 by making reference to the table. Then, the position detecting section 206 sends the control signal based on the relative position to the position adjusting section 124.

Thus, the position detecting section 206 detects the relative position of the image pickup device 10 with respect to the short focal distance lens 126 in the array direction in which the plurality of slits 150 is arrayed based on the difference of brightness of the respective bright portions 166*a* and 166*b*. Still more, the position detecting section 206 detects the relative position of the image pickup device 10 with respect to the short focal distance lens 126 in the direction in which the bright portion 166*a* extends based on the difference of brightness of the respective bright portions 166*b* respectively extending in the array direction of the bright portions 166*a*.

Then, the position adjusting section 124 detects relative position of the center o of the image pickup device 10 and the optical axis of the short focal distance lens 126 corresponding to the control signal received from the position detecting section 206. Accordingly, the misalignment of the optical axis in the x- and y-axis directions may be accurately adjusted because the relative position of the optical axis of the short focal distance lens 126 with the center of the image pickup device 10 may be accurately detected also in this example. It is noted that while the above description has been made by the concrete example in which the image pickup device 10 has the micro-lenses, it may be also applied in the same manner to a case in which it is required to accurately align the optical axis of the short focal distance lens 126 with the center of the image pickup device or with desired position other than the center even when another image pickup device has no micro-lens.

Still more, the short focal distance lens 126 and the slit section 148 may be fixed at the position where the center of the slit 150 overlaps with the optical axis of the short focal distance lens 126 and the position adjusting section 124 may move the short focal distance lens 126 and the slit section 148 together based on the control signal from the position detecting section 206. In this case, the center o of the image pickup device 10 may be accurately aligned with the optical axis of the short focal distance lens 126 by comparing the center of the image of the slit 150 projected to the photo-detecting plane 26 with the position of the center o of the image pickup device 10 and by moving the short focal distance lens 126 and the slit section 148 based on the comparison result after moving the short focal distance lens 126 by the position adjusting section 124.

Figure 14:
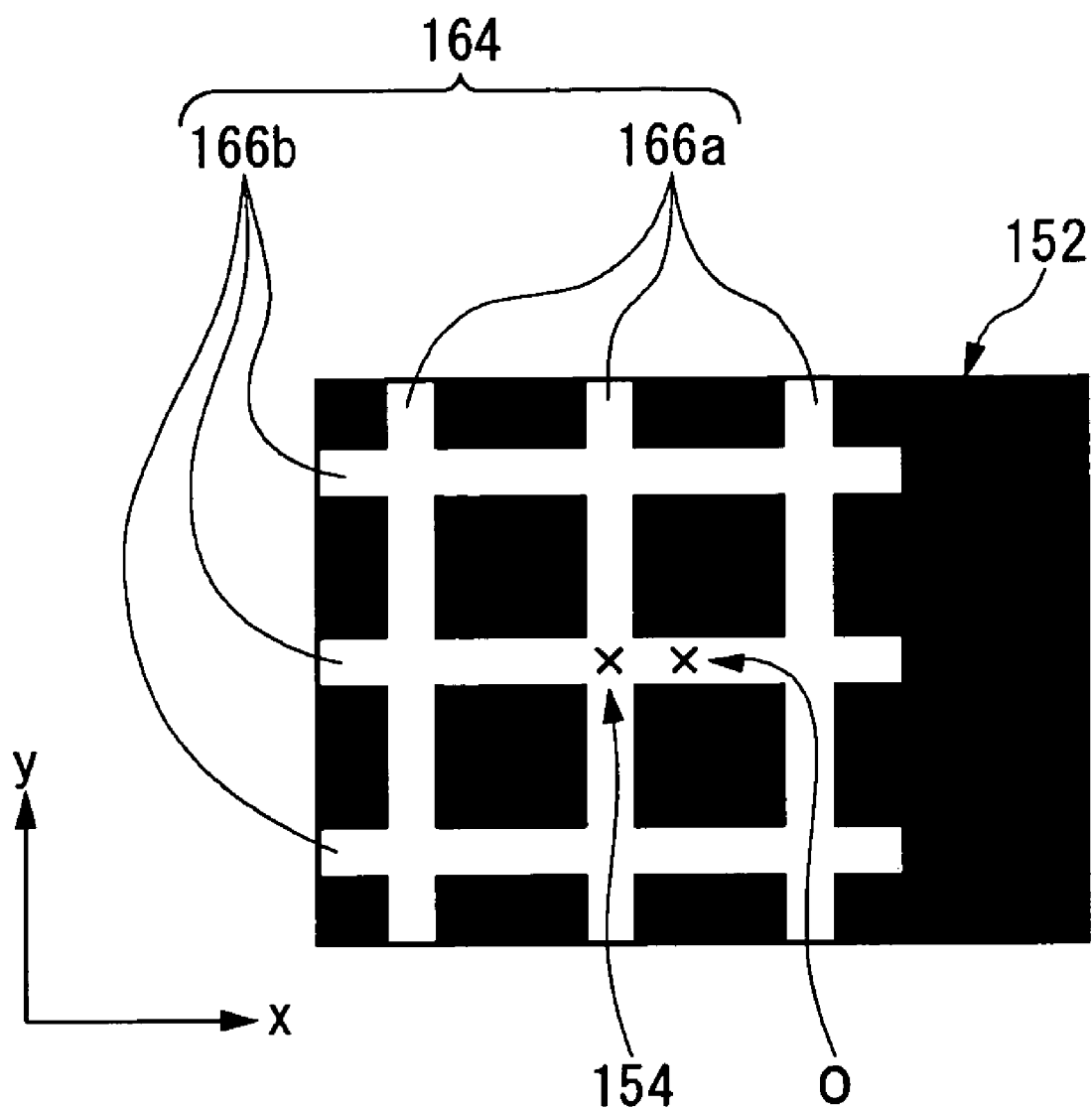
FIG. 14 shows one example of positional relationship between the center of the image pickup device and a center of an image of a slit projected to the image pickup device.

FIG. 14 shows one example of positional relationship between the center of the image pickup device 10 and the center of the image of the slit 150 projected to the image pickup device 10. In this example, the short focal distance lens 126 projects the image of the slit 150a on the photo-detecting plane 26. The center 154 of the image indicates the center of the image of the slit 150a projected to the image pickup device 10. The position detecting section 206 may detect the relative position of the short focal distance lens 126 with respect to the image pickup device 10 by calculating the relative position of the center 154 of the image of the slit 150a with respect to the center o of the image pickup device 10. In this case, the position detecting section 206 calculates a distance from the center o of the image pickup device 10 to the center 154 of the image by dividing into the dx in the x-axis direction and the dy in the y-axis direction on the photo-detecting plane 26 of the image pickup device 10. Then, based on the magnification m of the short focal distance lens 126, the position detecting section 206 calculates the distance in the x-axis direction as a product of the magnification m and the distance dx and the distance in the y-axis direction as a product of the magnification m and the distance dy, respectively.

Here, the distance between the image pickup device 10 and the short focal distance lens 126 is mechanically adjusted so that the focus of the short focal distance lens 126 is adjusted on the image pickup device 10 based on the focal distance of the short focal distance lens 126 and on dimensions of the respective apparatuses. However, because there exists allowance in the dimensions of the respective apparatuses, there is a case when the focus of the short focal distance lens 126 is insufficiently adjusted on the image pickup device 10. In this case, the image of the slit 150 projected on the image pickup device 10 becomes dim. Therefore, there is a case when the center 154 of the image of the slit 150 projected on the photo-detecting plane 26 cannot be accurately calculated.

Then, a control of move in the z-axis direction will be explained in this example. The position detecting section 206 judges whether or not the focus of the short focal distance lens 126 is adjusted to the image pickup device 10 by calculating a width of a rising or falling edge of the pixel value and by comparing it with a predetermined value on a line segment crossing with boundary of brightness of the bright portions 166a and 166b. When the position detecting section 206 judges that the focus of the short focal distance lens 126 is not adjusted to the image pickup device 10, it causes the position adjusting section 124 to move the short focal distance lens 126 by a predetermined distance in parallel to the optical axis of the short focal distance lens 126. Then, the position detecting section 206 calculates the width of the rising or falling edge of the pixel value again. It is noted that a method of finding the position in the z-axis direction of the short focal distance lens 126 where the focus is best by scanning the Z stage.

Thus, the testing apparatus 100 repeats the calculation of the width of the rising or falling edge of the pixel value and the move of the short focal distance lens 126 until when the width of the rising or falling edge of the pixel value in the boundary of brightness of the respective bright portions 166a and 166b becomes a value less than the predetermined value. Thereby, the image of the slit 150 is projected clearly on the image pickup device 10 and the position detecting section 206 can accurately calculate the center position of the projected image of the slit 150. Accordingly, the position of the center o of the image pickup device 10 may be accurately aligned with the optical axis of the short focal distance lens 126.

Figure 15:
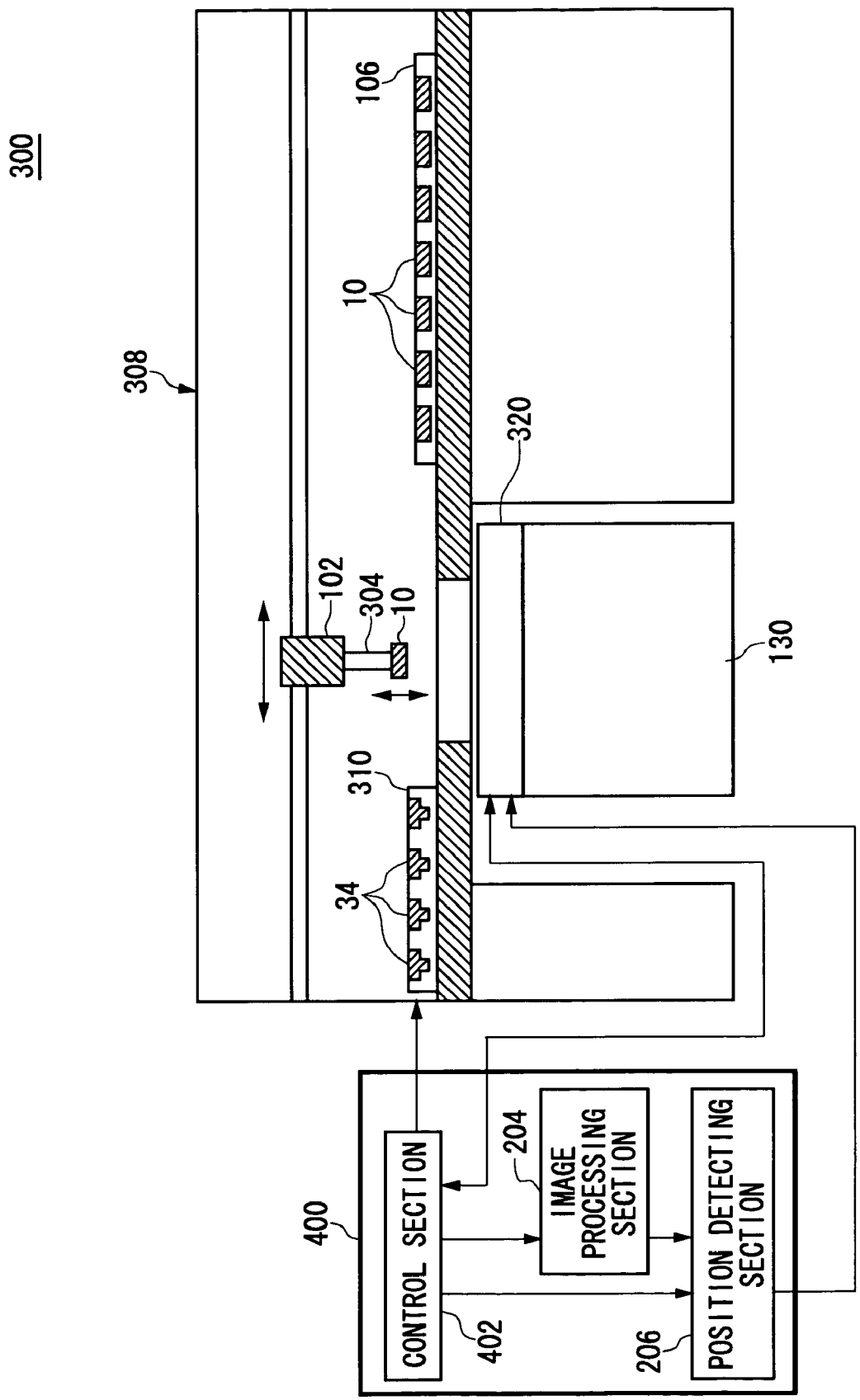
FIG. 15 shows one exemplary configuration of a camera module manufacturing apparatus according to one embodiment of the invention.

FIG. 15 shows one exemplary configuration of a camera module manufacturing apparatus 300 according to one embodiment of the invention. It is noted that in FIG. 15, components denoted by the same reference numerals with those in FIG. 1 have the same or similar functions with those components in FIG. 1, so that their explanation will be omitted here, except of those points explained below.

The camera module manufacturing apparatus 300 has a parts conveying unit 308, a assembly section 320, a control unit 400 and an illumination unit 130. The parts conveying unit 308 has a plurality of trays 106, a tray 310, a moving section 102 and an attaching section 304. A plurality of manufacturing image pickup devices 10 and an adjusting image pickup device 10 whose characteristics have been measured in advance are mounted on the tray 106. A plurality of manufacturing lens units 34 and an adjusting lens unit 34 whose characteristics have been measured in advance are mounted on the tray 310. A manufactured camera module 40 is also mounted on the tray 310.

The moving section 102 moves the attaching section 304 on the tray 106, the assembly section 320 and the tray 310. The attaching section 304 takes one lens unit 34 out of the tray 310 and mounts it on the assembly section 320. Then, the attaching section 304 takes the image pickup device 10 out of the tray 106 and mounts it on the lens unit 34 on the assembly section 320. Further, after manufacturing, the attaching section 304 takes the image pickup device 10 and the lens unit 34 out of the assembly section 320 and mounts them on the tray 310.

The lens unit 34 is mounted on the assembly section 320 and is electrically connected with the assembly section 320. When the image pickup device 10 is mounted on the lens unit 34 on the assembly section 320, the assembly section 320 receives the output signal from the image pickup device 10 via the lens unit 34 and sends it to the control unit 400. Still more, the assembly section 320 feeds the control signal received from the control unit 400 to the image pickup device 10 via the lens unit 34. The control unit 400 has a control section 402, an image processing section 204 and a position detecting section 206. The control section 202 feeds the control signal to the assembly section 320 and the parts conveying unit 308.

Figure 16:
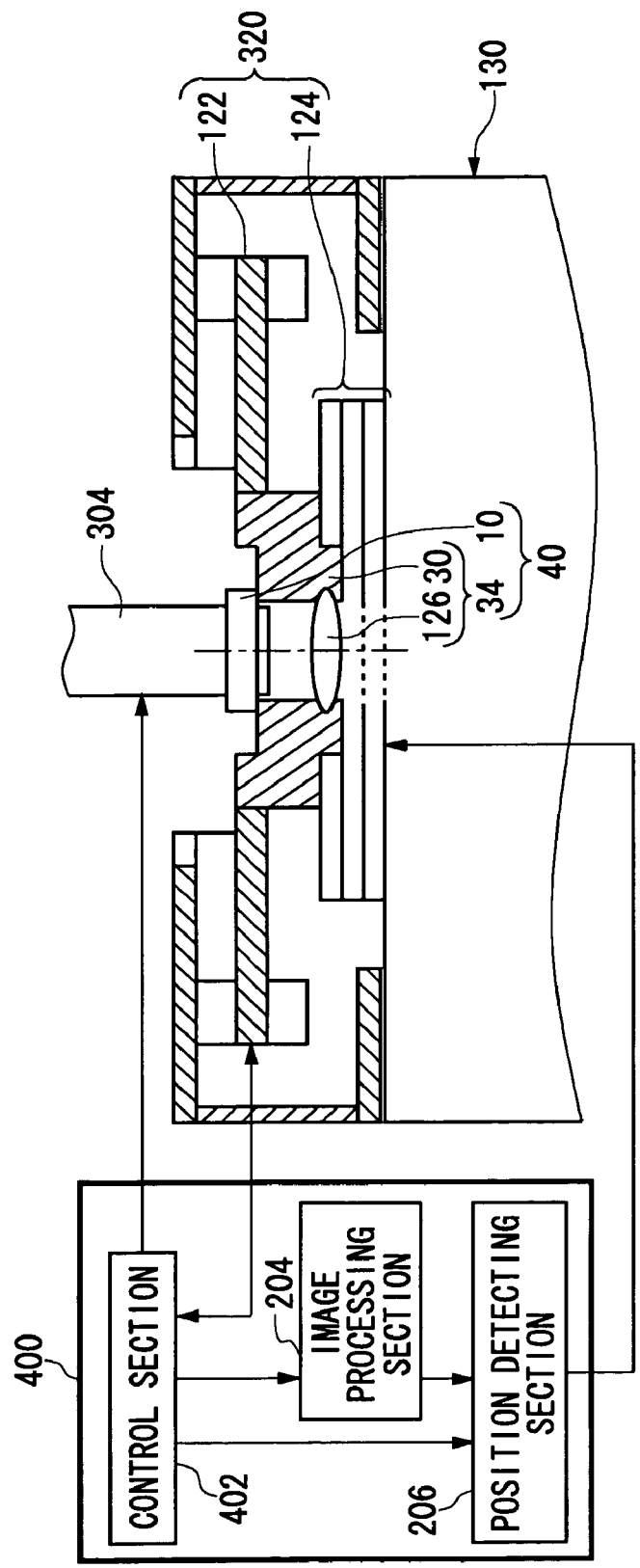
FIG. 16 shows one detailed exemplary configuration of an assembly section and a camera module.

FIG. 16 shows one detailed exemplary configuration of the assembly section 320 and the camera module 40. The camera module 40 has the lens unit 34 and the image pickup device 10. The camera module 40 is manufactured by attaching the image pickup device 10 to the lens unit 34. The image pickup device 10 is attached to the lens unit 34 by the attaching section 304 by using flip chip mounting for example. The lens unit 34 has a retaining member 30 and the short focal distance lens 126. The retaining member 30 retains the short focal distance lens 126. The retaining member 30 is also electrically connected with the image pickup device 10 when the image pickup device 10 is mounted. The assembly section 320 has the signal input/output section 122 and the position adjusting section 124.

Figure 17:
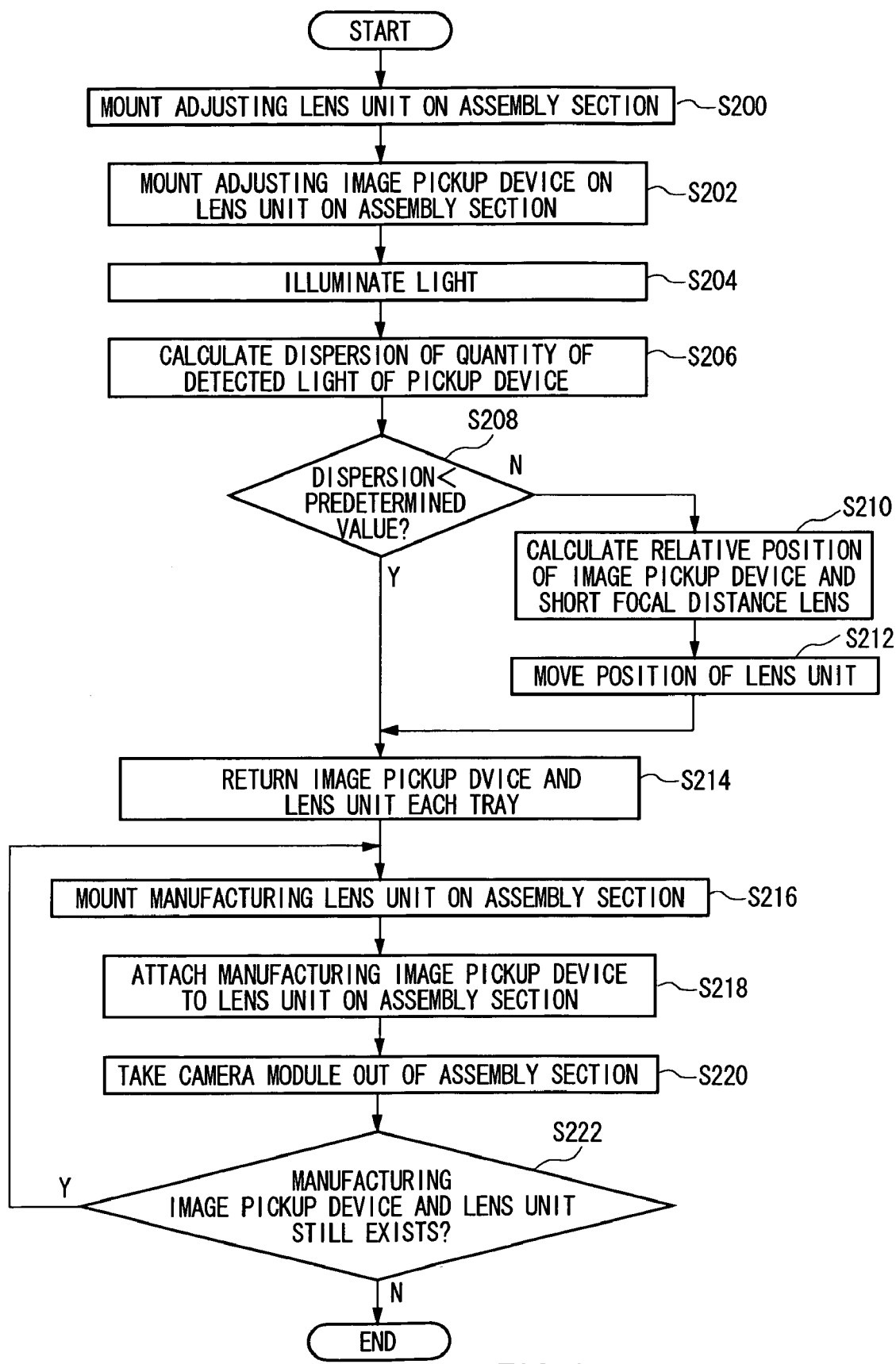
FIG. 17 is a flowchart showing one exemplary manufacturing steps of the camera module.

FIG. 17 is a flowchart showing one exemplary manufacturing steps of the camera module 40. At first, the parts conveying unit 308 takes the adjusting lens unit 34 out of the tray 310 and mounts it on the assembly section 320 in Step S200. Next, the parts conveying unit 308 takes the adjusting image pickup device 10 out of the tray 106 and mounts it on the lens unit 34 mounted on the assembly section 320 in Step S202.

Then, the light source 142 is turned on and the light generated by the light source 142 is illuminated to the image pickup device 10 via the illuminating optical system 162 and the short focal distance lens 126 in the lens unit 34 in Step S204.

The control section 202 generates image data by converting the output signal of the image pickup device 10 corresponding to the quantity of detected light of the illuminated light into the pixel value and sends it to the position detecting section 206. The position detecting section 206 calculates dispersion of the quantity of detected light of the image pickup device 10 based on the received image data in Step S206. Then, the position detecting section 206 compares the calculated dispersion of the quantity of detected light with the predetermined value in Step S208.

When the position detecting section 206 judges that the dispersion of the quantity of detected light is smaller than the predetermined value, i.e., Yes in Step S208, the parts conveying unit 308 takes the adjusting image pickup device 10 and the lens unit 34 out of the assembly section 320 and returns them to the trays 106 and 310 in Step S214. When the position detecting section 206 judges that the dispersion of quantity of detected light is larger than the predetermined value, i.e., No in Step S208, the position detecting section 206 calculates the relative position of the image pickup device 10 and the short focal distance lens 126 in the lens unit 34 by comparing the position of the photo-detecting element 12 where the maximum of the quantity of detected light is outputted with the position of the center o of the image pickup device 10 and sends a control signal based on this relative position to the position adjusting section 124 in Step S210. Then, the position adjusting section 124 moves the lens unit 34 corresponding to the received control signal in Step S212. It is desirable to fix the both of the image pickup device 10 and the lens unit 34 by fixing means such as adhesive in a state when the both are positioned.

Next, the parts conveying unit 308 takes the adjusting image pickup device 10 and lens unit 34 out of the assembly section 320 and returns them to the trays 106 and 310 in Step S214. Then, the parts conveying unit 308 takes one manufacturing lens unit 34 out of the tray 310 and mounts it on the assembly section 320 in Step S216. Next, the parts conveying unit 308 takes one manufacturing image pickup device 10 out of the tray 106 and mounts it on the lens unit 34 on the assembly section 320 to manufacture the camera module 40 by attaching the image pickup device 10 to the lens unit 34 in Step S218. In Step S218, the attaching section 304 attaches the image pickup device 10 to the lens unit 34 while holding the relative position of the image pickup device 10 and the short focal distance lens 126 at the position after the move.

Next, the parts conveying unit 308 takes the manufactured camera module 40 out of the assembly section 320 and mounts it on the tray 310 in Step S220. Then, the parts conveying unit 308 judges whether or not the manufacturing image pickup device 10 and lens unit 34 exist respectively on the trays 106 and 310 in Step S222. When the manufacturing image pickup device 10 and lens unit 34 exist respectively on the trays 106 and 310, i.e., Yes in Step S222, the parts conveying unit 308 takes one manufacturing lens unit 34 out of the tray 310 again and mounts it on the assembly section 320 in Step S216. When either one of the manufacturing image pickup device 10 and the lens unit 34 does not exist on the tray 106 or on the tray 310, i.e., No in Step S222, the operation of the camera module manufacturing apparatus 300 shown in the flowchart ends.

Thus, the camera module manufacturing apparatus 300 adjusts the position of the image pickup device 10 with respect to the short focal distance lens 126 based on the output of the image pickup device 10 and manufactures the camera module 40 at the adjusted position, so that it can manufacture the camera module 40 in which the optical axis of the short focal distance lens 126 is accurately aligned with the center o of the image pickup device 10.

It is noted that the camera module manufacturing apparatus 300 may execute the procedure from Steps S200 through S212 and from Step S218 through S222 without using the adjusting image pickup device 10 and lens unit 34. In this case, the camera module manufacturing apparatus 300 executes Step S200 when the manufacturing image pickup device 10 and lens unit 34 exist respectively on the trays 106 and 310 in Step S222, i.e., Yes in Step S222.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

What is claimed is:

1. A position detection apparatus for detecting a position of an image pickup device, comprising:
   a light source;
   an illumination lens constructed and arranged to cause light from said light source to illuminate said image pickup device; and
   a position detecting section for detecting a relative position, based on the output of said image pickup device, of said image pickup device, said relative position being relative to said illumination lens;
   wherein said image pickup device is constructed and arranged to provide an output related to light incident thereon, and comprises:
      an array of photo-detecting elements, each of which provides an output corresponding to an intensity of light incident thereon; and
      a plurality of micro-lenses corresponding to respective photo-detecting elements, each having a respective optical axis at a position deviated to the inside from the center of its corresponding photo-detecting element as said corresponding photo-detecting element is distant from the center of said array; and
   a moving section for changing said relative position to a position set in advance by moving at least one of said image pickup device and said illumination lens based on said relative position detected by said position detecting section.

2. The position detection apparatus as set forth in claim 1, wherein said moving section changes said relative position of said image pickup device to said position set in advance so that the intensity of light received by said respective photo-detecting elements becomes almost equal.

3. The position detection apparatus as set forth in claim 1, further comprising a structure having a slit in which an opening that transmits a part of the light generated by said light source is provided at a known position with respect to said illumination lens; wherein
   said illumination lens projects an image of said opening on said image pickup device by illuminating the light received from said light source via said opening of said slit onto said image pickup device;
   said image pickup device outputs said output signal that presents the projected image of said opening; and
   said position detecting section detects relative position of said image pickup device with respect to said illumination lens by detecting the relative position of said opening with respect to said image pickup device based on said output signal of said image pickup device.

4. The position detection apparatus as set forth in claim 3, wherein
  a center of said openings is provided at a position overlapping with an optical axis of said illumination lens; and
  said position detecting section detects relative position of said slit with respect to said image pickup device by calculating relative position of a center of images of said openings with respect to a center of said array of photo-detecting elements.

5. The position detection apparatus as set forth in claim 3, wherein
  said slit has a plurality of openings that extend respectively in an extension direction parallel to each other;
  said illumination lens projects images of respective openings onto said image pickup device; and
  said position detecting section detects the relative position of said image pickup device with respect to said illumination lens in an array direction in which said plurality of openings is arrayed based on differences of brightness of said respective images.

6. The position detection apparatus as set forth in claim 5, wherein
  said slit has a plurality of openings that extend in a direction of said array direction;
  said illumination lens also projects the respective images of said plurality of openings that extend respectively in said array direction onto said image pickup device; and
  said position detecting section also detects the relative position of said image pickup device with respect to said illumination lens in said extension direction based on the difference of brightness of the respective images of said plurality of openings extending respectively in said array direction.

7. A position detection method for detecting a position of an image pickup device that outputs an output signal corresponding to an intensity of detected light, comprising:
  generating light;
  illuminating light generated by said light source onto said image pickup device by means of an illumination lens; and
  detecting the relative position of said image pickup device with respect to said illumination lens based on the output signal from said image pickup device,
  wherein said image pickup device comprises:
    an array of photo-detecting elements each of which provides an output corresponding to an intensity of light incident thereon; and
    a plurality of micro-lenses corresponding to respective photo-detecting elements and each having a respective optical axis at a position deviated to the inside from the center of its corresponding photo-detecting element as said corresponding photo-detecting element is distant from the center of said array of said plurality of photo-detecting elements; and
  wherein said position detecting step comprises changing the position of said image pickup relative to said illumination lens to a position set in advance by moving at least one of said image pickup device and said illumination lens based on said relative position detected by said position detecting section.

8. A testing apparatus for testing an image pickup device that outputs output signal corresponding to intensity of detected light; comprising:
  a light source;
  an illumination lens for illuminating light generated by said light source on said image pickup device;
  a position detecting section for detecting the relative position of said image pickup device with respect to said illumination lens based on the output signal of said image pickup device;
  a moving section for changing said relative position to a position set in advance by moving at least one of said image pickup device and said illumination lens based on said relative position detected by said position detecting section; and
  a judging section for judging whether or not said image pickup device is defect-free based on said output signal outputted out of said image pickup device held at said position set in advance when testing said image pickup device
  wherein said image pickup device comprises:
    an array of photo-detecting elements each of which provides an output corresponding to an intensity of light incident thereon; and
    a plurality of micro-lenses corresponding to respective photo-detecting elements and each having a respective optical axis at a position deviated to the inside from the center of its corresponding photo-detecting element as said corresponding photo-detecting element is distant from the center of said array of said plurality of photo-detecting elements; and
  wherein said position detection apparatus further comprises a moving section for changing position of said image pickup relative to said illumination lens to a position set in advance by moving at least one of said image pickup device and said illumination lens based on said relative position detected by said position detecting section.

9. A camera module manufacturing apparatus for manufacturing a camera module having an image pickup device that outputs an output signal corresponding to an intensity of detected light, an illumination lens for illuminating light onto said image pickup device and a holding member for holding said illumination lens; comprising:
  a light source for generating light;
  a position detecting section for detecting the relative position of said image pickup device with respect to said illumination lens based on the output signal of said image pickup device;
  a moving section for changing said relative position of said image pickup device to position set in advance by moving at least one of said image pickup device and said holding member holding said illumination lens based on said relative position detected by said position detecting section; and
  an attaching section for attaching said image pickup device to said holding member while retaining said relative position of said image pickup device at said position set in advance
  wherein said image pickup device comprises:
    an array of photo-detecting elements each of which provides an output corresponding to an intensity of light incident thereon; and
    a plurality of micro-lenses corresponding to respective photo-detecting elements and each having a respective optical axis at a position deviated to the inside from the center of its corresponding photo-detecting element as said corresponding photo-detecting element is distant from the center of said array of said plurality of photo-detecting elements; and wherein said position detection apparatus further comprises a moving section for changing the position of said image pickup relative to said illumination lens to a position set in advance by moving at least one of said image pickup device and said illumination lens based on said relative position detected by said position detecting section.

10. A testing apparatus for testing optical characteristics of an image pickup device in which a plurality of photo-detecting elements is disposed on its photo-detecting plane, comprising:

a short focal distance lens that has optical characteristics of short focal distance corresponding to micro-lenses for illuminating light respectively to said plurality of photo-detecting elements, whose optical axis is disposed in a direction of a vertical axis that crosses at right angles with the photo-detecting plane of said image pickup device and that inputs received and refracted parallel rays to the photo-detecting plane of said image pickup device;

a stage movable in three axial directions while retaining said short focal distance lens; and a position detection apparatus for detecting relative position that presents relative misalignment of center position of said plurality of photo-detecting elements and the optical axis of said short focal distance lens from levels of output signals of said plurality of photo-detecting elements by receiving the output signals outputted out of said image pickup device by the rays inputted from said short focal distance lens to the photo-detecting plane of said image pickup device; wherein said short focal distance lens is moved in a direction in which the relative misalignment of the center of said plurality of photo-detecting elements and the optical axis of said short focal distance lens is eliminated based on the relative position detected by said position detection apparatus.

11. The testing apparatus as set forth in claim 10, further comprising a test head for mounting said image pickup device;

a parts conveying unit for conveying said image pickup device to mount on said test head;

a socket that electrically connects with electrical terminals of said image pickup device mounted on said test head; and a signal input/output section for feeding a control signal from said testing apparatus to said image pickup device and for feeding an output signal of said image pickup device to said testing apparatus via said socket.

12. The testing apparatus as set forth in claim 10, further comprising a slit section having an opening that transmits said parallel rays to be incident on said short focal distance lens while blocking a part thereof; and said position detection apparatus detects relative position presenting relative misalignment of center position of said plurality of photo-detecting elements and the optical axis of said short focal distance lens from levels of output signals of said plurality of photo-detecting elements by receiving the output signal of said image pickup device corresponding to an image of said opening projected onto the photo-detecting plane of said image pickup device based on said opening.

* * * * *